(12) United States Patent
Kinoshita

(10) Patent No.: US 11,146,074 B2
(45) Date of Patent: Oct. 12, 2021

(54) CONTROLLER, CONTROL METHOD, AND CONTROL PROGRAM

(71) Applicant: RENESAS ELECTRONICS CORPORATION, Tokyo (JP)

(72) Inventor: Yu Kinoshita, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 131 days.

(21) Appl. No.: 16/523,729

(22) Filed: Jul. 26, 2019

(65) Prior Publication Data
US 2020/0067332 A1 Feb. 27, 2020

(30) Foreign Application Priority Data
Aug. 27, 2018 (JP) .............................. JP2018-158424

(51) Int. Cl.
*H02J 7/00* (2006.01)
*G06F 1/26* (2006.01)
*G06F 1/3212* (2019.01)
*G06F 13/38* (2006.01)

(52) U.S. Cl.
CPC ............... *H02J 7/00* (2013.01); *G06F 1/263* (2013.01); *G06F 1/3212* (2013.01); *G06F 13/382* (2013.01); *G06F 2213/0042* (2013.01)

(58) Field of Classification Search
CPC ........ G06F 1/263; G06F 1/3212; G06F 1/382; G06F 2213/0042; H02J 7/00
See application file for complete search history.

(56) References Cited

U.S. PATENT DOCUMENTS

| 9,558,144 | B2* | 1/2017 | Nge | G06F 13/4068 |
| 10,261,557 | B2* | 4/2019 | Kim | G06F 1/10 |
| 10,289,589 | B2* | 5/2019 | Chhor | G06F 13/4022 |
| 10,437,752 | B2* | 10/2019 | Xu | G06F 13/4068 |
| 10,579,119 | B2* | 3/2020 | Lambert | G06F 1/266 |

(Continued)

FOREIGN PATENT DOCUMENTS

| JP | 2017-138870 A | 8/2017 |
| JP | 2018-007451 A | 1/2018 |

OTHER PUBLICATIONS

Universal Serial Bus Type-C Cable and Connector Specification, Release 1.3, Jul. 14, 2017.

*Primary Examiner* — Brian T Misiura
(74) *Attorney, Agent, or Firm* — McDermott Will & Emery LLP

(57) ABSTRACT

A controller for providing a DRP port according to USB Type-C standard. A state manager coupled to a power manager for controlling charging and discharging of a battery. A signal transmission module for exchanging a signal with a connection destination via a communication line in the USB cable according to an instruction from the state manager. The signal transmission module is possible to indicate the communication line whether the port is featured as the power supply side or the power reception side. When the port is featured as the power supply side, the state manager supplies an electric power stored in the battery to the connection destination and if the battery becomes the condition of Low Battery, the state manager stops supplying the electric power to the connection destination while maintaining the state that the port is featured as the power supply side.

12 Claims, 21 Drawing Sheets

(56) References Cited

U.S. PATENT DOCUMENTS

| | | | |
|---|---|---|---|
| 10,804,713 B2* | 10/2020 | Shen | H02J 7/342 |
| 2017/0229892 A1 | 8/2017 | Kobayashi | |
| 2018/0004277 A1 | 1/2018 | Matsui et al. | |
| 2018/0004696 A1* | 1/2018 | Lee | G06F 13/4022 |
| 2018/0275732 A1* | 9/2018 | Chen | G06F 1/266 |
| 2019/0372375 A1* | 12/2019 | Kayama | H02J 7/00 |
| 2020/0073349 A1* | 3/2020 | Yamaya | G05B 19/042 |
| 2020/0174538 A1* | 6/2020 | Aoki | G06F 13/4282 |

* cited by examiner

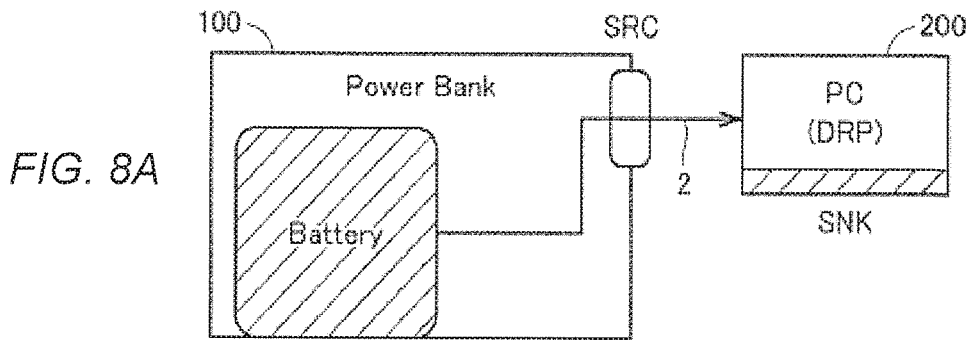
*FIG. 8A*
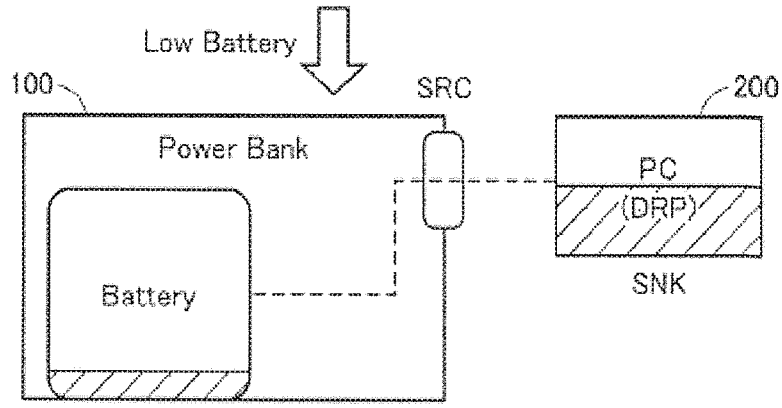
*FIG. 8B* — Maintaining the state of SRC with making VBUS disabled
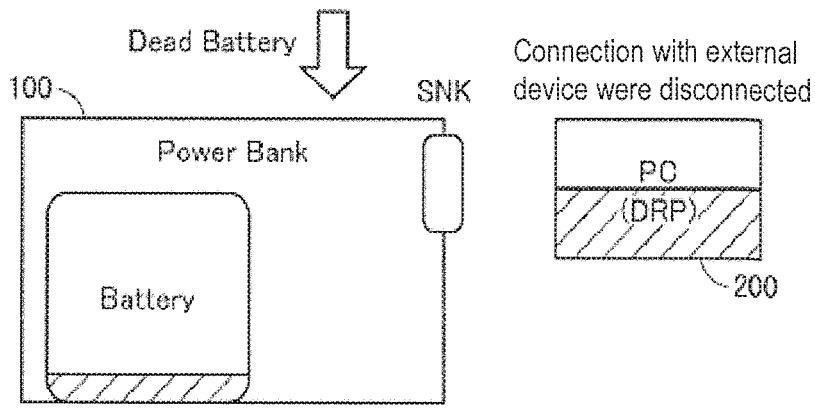
*FIG. 8C* — Switch to SNK
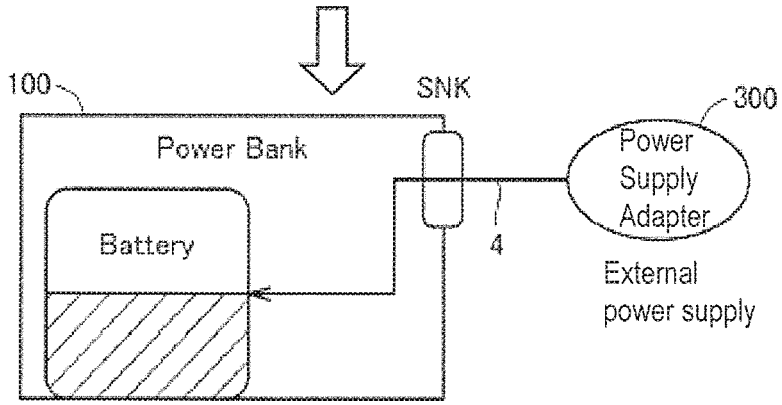
*FIG. 8D*

CONTROLLER, CONTROL METHOD, AND CONTROL PROGRAM

CROSS-REFERENCE TO RELATED APPLICATIONS

The disclosure of Japanese Patent Application No. 2018-158424 filed on Aug. 27, 2018 including the specification, drawings and abstract is incorporated herein reference in its entirety.

BACKGROUND

The present disclosure relates to controllers, for example, the present disclosure is used to execute sequences in accordance with the Universal Serial Bus standard to execute a power supplying and receiving operation with respect to a connection destination.

Along with the spread of mobile devices, mobile batteries for supplying electric power to mobile devices and the like have become widespread (for example, see Japanese unexamined Patent Application publication No. 2017/138870 and the like). In the following explanation, a power storage device that stores electric power supplied from an external power supply and supplies electric power stored in the external device is referred to as a "Power Bank".

In a Power Bank commonly used at present, an output (power supply) port for supplying power to external devices and an input (power reception) port for receiving power from an external power supply are provided separately from each other. For example, a USB Standard-A type interface is used for the power supply port, and a USB Micro-B type interface is used for the power reception port. Since the power supply port and the power reception port are independently provided for each function in this manner, for example, even if the cables are kept connected after the Power Bank is charged, the stored electric power does not flow backward.

As a newer USB standard, a USB Type-C interface is becoming popular (see, for example, "Universal Serial Bus Type-C Cable and Connector Specification", Release 1.3, Jul. 14, 2017). According to the USB Type-C interface, ports having the same shapes are used for power supply and power reception. Therefore, a single port supports both power supply and power reception.

In the USB Type-C standard, a device for supplying electric power (power supply side) is referred to as "Source" or "SRC", and a device for receiving electric power (power reception side) is referred to as "Sink" or "SNK". Furthermore, devices corresponding to both power supply and power reception are referred to as "DRP (Dual Role Power)". By implementing the DRP function, it is possible to reduce the cost and the space by requiring only one port, which is conventionally required to be two ports separately (see, for example, Japanese unexamined Patent Application publication No. 2018-007451).

With these advantages, when USB Type-C interfaces are employed in mobile devices such as Power Bank, smart phones, tablets, personal computers, etc., it is expected that the DRP function will be implemented so that the DRP function can support both power supply and power reception at one port.

SUMMARY

It is assumed that only a single port of the USB Type-C interface as described above is provided, and power is supplied to external devices using a Power Bank in which a DRP function is implemented. The inventor of the present application has found that in such a configuration, a new problem that does not occur when power is supplied by using a Power Bank in which the power supply port and the charge port are separately provided occurs.

Other objects and novel features will become apparent from the description of this specification and the accompanying drawings.

According to one embodiment, a controller for providing a port compatible with DRP (Dual Role Power), which can be any of a power supply side or a power reception side according to USB (Universal Serial Bus) Type-C standard, comprising: a state manager coupled to a power manager for controlling charging and discharging of a battery, a signal transmission module for exchanging a signal with a connection destination via a communication line in the USB cable according to an instruction from the state manager, wherein the signal transmission module is possible to indicate the communication line whether the port is featured as the power supply side or the power reception side, wherein when the port is featured as the power supply side, the state manager supplies an electric power stored in the battery to the connection destination and if the battery becomes the condition of Low Battery, the state manager stops supplying the electric power to the connection destination while maintaining the state that the port is featured as the power supply side.

According to an embodiment, an unintended operation of the Power Bank implementing the DRP function by the user can be avoided.

BRIEF DESCRIPTION OF THE DRAWINGS

FIG. 8A-FIG. 8D are schematic views illustrating an example of a supplying and receiving power operation executed between a Power Bank according to the first embodiment and a PC.

DETAILED DESCRIPTION

Figure 1:
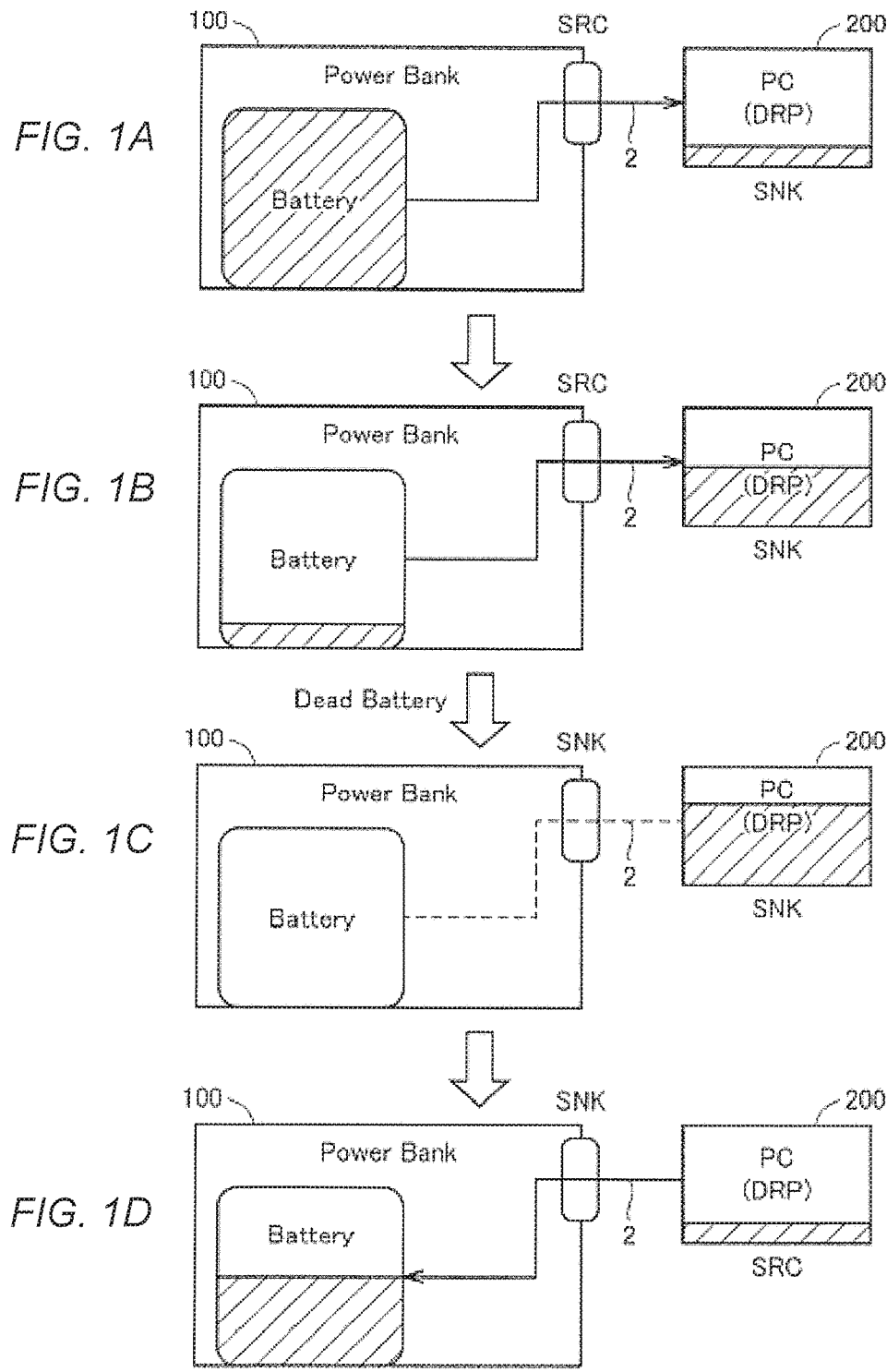
FIG. 1A-FIG. 1D are schematic diagrams illustrating an operation pertaining to a power supplying operation of a Power Bank equipped with a DRP function.

Several embodiments will be described in detail with reference to the drawings. The same or corresponding portions in the drawings are denoted by the same reference numerals, and description thereof will not be repeated.

A configuration in which only a single port of a USB Type-C interface is provided and power is supplied to external devices using a Power Bank in which a DRP function is implemented will be described. At this time, it is assumed that the USB Type-C interface and the DRP function are also implemented in the external devices connected to the Power Bank. In the following description, an external device in which a DRP function is implemented is also referred to as a "DRP device".

Sequences relating to supplying power in accordance with the USB Type-C standard will be described below. As described above, the USB Type-C standard defines three modes: Source (SRC), Sink (SNK), and DRP. These modes are also referred to as Port Role. In the following, devices in charge of Port Role of DRP will be mainly described.

FIG. 1 is a schematic diagram showing an exemplary operation related to a power supply operation of a Power Bank 100 equipped with a DRP function. In FIG. 1, a laptop personal computer 200 is assumed as a DRP device. As a matter of course, the DRP device is not limited to a laptop personal computer, and any device having a power storage function can be adopted.

Referring to FIG. 1A, first, a Power Bank 100 of a power supply side and a PC 200 expected to receive power are connected via a USB cable 2. Then, the Port Role of the Power Bank 100 becomes SRC (specifically, Attached.SRC (a state in which connection (recognition) is performed as the power supply side) as described later) and the Port Role of the PC 200 becomes SNK (specifically, Attached. SNK (a state in which connection (recognition) is performed as the power reception side) as described later). As a result, electric power is started to be supplied from the Power Bank 100 to the PC 200.

As shown in FIG. 1B, it is assumed that the power supply from the Power Bank 100 to the PC 200 is continued, and finally, as shown in FIG. 1C, the discharging voltage of the battery is lowered to a state in which the Power Bank 100 cannot operate not only as a power supply but also as a system. This condition is referred to as "Dead Battery".

The DRP function is realized by control by the system, and cannot operate as a system in the Dead Battery, so that the DRP function cannot be maintained. In this state, since the DRP Toggle operation cannot be performed, the Power Bank 100 is fixed as hardware to the connection waiting state of the SNK (Unattached.SNK (not connected (not recognized) as the power reception side) as described later) until the Dead Battery is resolved.

On the other hand, in order to perform the DRP Toggle operation, the PC 200 detects that the Power Bank 100 is in the SNK-connection waiting state, and becomes the SRC. Then, as shown in FIG. 1D, the PC 200 starts supplying power to the Power Bank 100. That is, the Power Bank 100 will draw power from the powered PC 200.

In this manner, the above-described problem may occur if both power supply and power reception are supported by a single port having a DRP function implemented in accordance with the USB Type-C standard. In other words, the user expects only that the power supply to the PC 200 is stopped when the Power Bank 100 is turned Dead Battery, but the roles of the supplying and receiving power are reversed, so that the operation is not the operation expected by the user.

Figure 2:
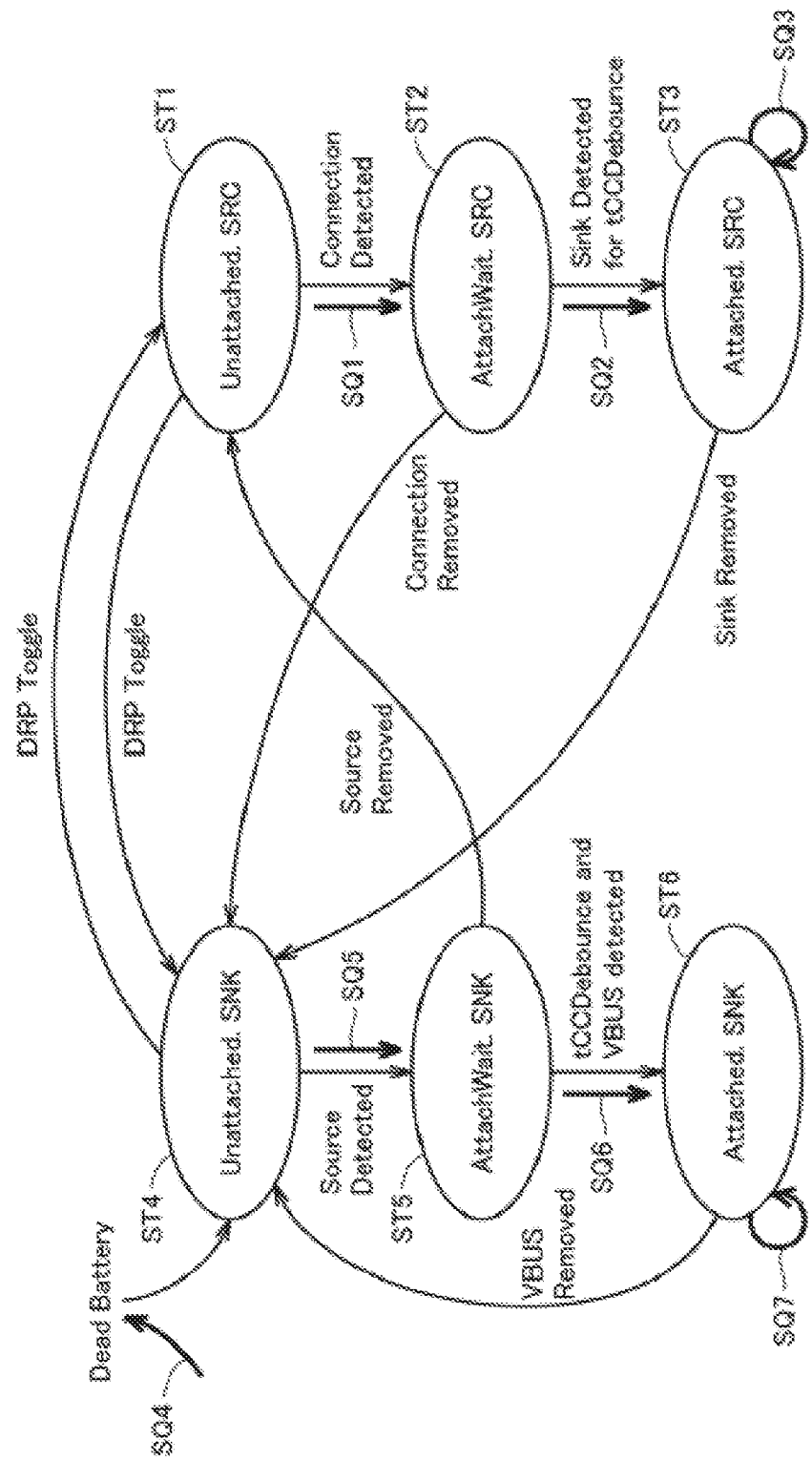
FIG. 2 shows a summary of state transitions of devices responsible for the Port Role of DRP in accordance with the USB Type-C standard.

Here, the state transition related to the operation as the above-mentioned problem will be described. FIG. 2 is a diagram showing a main part of state transitions of devices in charge of Port Role of DRP according to the USB Type-C standard.

Referring to FIG. 2, the device in charge in which the DRP function is implemented has six states: Unattached. SRC (ST1), AttachWait.SRC (ST2), Attached.SRC (ST3), Unattached.SNK (ST4), AttachWait.SNK (ST5), and Attached.SNK (ST6), and takes any state at any point in time.

In the state prior to the connection of the USB cable 2, the Power Bank 100 repeats state transitions between Unattached.SRC (ST1) and Unattached.SNK (ST4) (DRP Toggle operation).

When the USB cable 2 is connected, the condition of "Connection Detected" is satisfied, and the Power Bank 100 transitions from Unattached.SRC (ST1) to AttachWait.SRC (ST2) (sequence SQ1). When a condition such as a supply voltage between the Power Bank 100 and the PC 200 is satisfied, the Power Bank 100 transitions from AttachWait. SRC (ST2) to Attached.SRC (ST3) (Sequence SQ2). The Attached.SRC (ST3) means a state in which the connection as the device of the power supply side is recognized. In this condition, the power supply from the Power Bank 100 to the PC 200 is started (Sequence SQ3).

If the battery has enough charge capacity, the Power Bank 100 can manage the state transition as shown in FIG. 2, but when the discharge voltage of the battery drops to a state where the discharge voltage cannot operate as a system and the state transition becomes Dead Battery, the state transition cannot be managed. As a result, it is fixed to Unattached. SNK (ST4) (sequential SQ4). Unattached.SNK (ST4) means a connection-waiting state as SNK.

When the Power Bank 100 recovers from the Dead Battery by supplying power from the connected PC 200 (DRP device), it restarts managing the state transitions. At this time, since the connected PC 200 is SRC, the condition of "Source Detected" is satisfied, and the Power Bank 100 transitions from Unattached.SNK (ST4) to AttachWait.SNK (ST5) (Sequence SQ5). When the condition such as the supply voltage between the Power Bank 100 and the PC 200 is satisfied, the Power Bank 100 shifts to Attached.SNK (ST6) (sequence SQ6). Attached.SNK (ST6) means that the connection as the device of the power reception side is recognized. In this condition, the power supply from the PC 200 to the Power Bank 100 is started (sequence SQ7).

That is, as shown in FIG. 1D, the electric power supplied from the Power Bank 100 to the PC 200 is supplied from the PC 200 to the Power Bank 100 in reverse.

Figure 3:
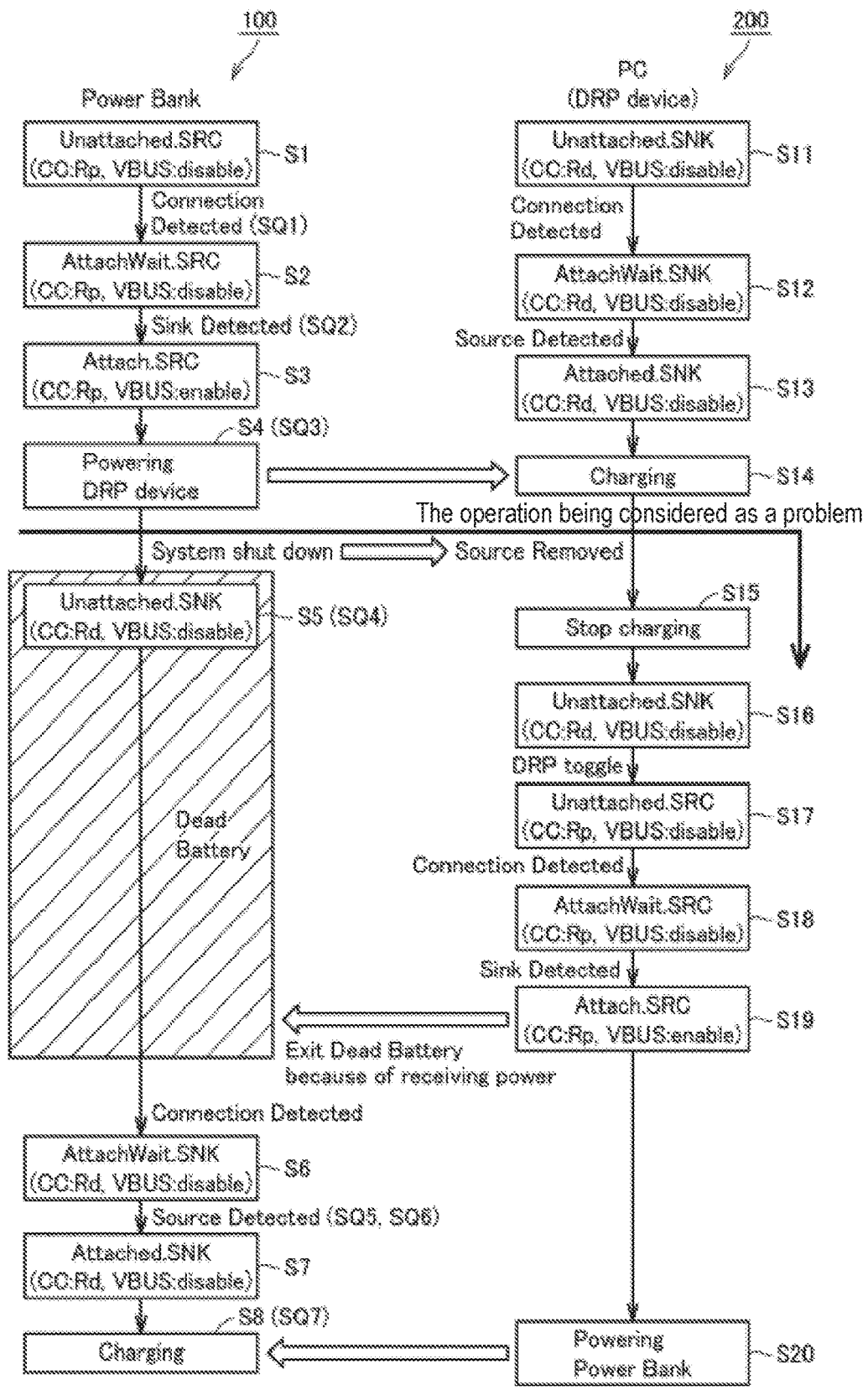
FIG. 3 is a sequence chart illustrating a sequence pertaining to a state transition shown in FIG. 2.

FIG. 3 is a sequence chart showing a sequence related to the state transition shown in FIG. 2. FIG. 3 shows the process performed in each of the Power Bank 100 and the PC 200 implementing the DRP function. Note that the value ("Rp" or "Rd") following "CC:" shown in some steps of FIG. 3 means the resistance value (pull-up resistance and pull-down resistance (see FIG. 5 to be described later)) appearing on the communication lines (CC1 and CC2) included in the USB cable 2, and the value ("enable" or "disable") following "VBUS:" means whether or not the prescribed voltage is supplied to the power line included in the USB cable 2.

Typically, "enable" means a state in which a voltage equal to or higher than a vSafe5V voltage according to the USB Type-C standard is applied to the power line, and "disable" means a state in which a vSafe0V according to the USB Type-C standard is applied to the power line.

Referring to FIG. 3, the Power Bank 100 is initially Unattached.SRC (step S1). At this time, the Power Bank 100 shows the resistor Rp in the communication line, and does not generate the prescribed voltages in the power line.

In the present specification, "showing the resistance value Rp on the communication line" and "showing the resistance value Rd on the communication line" mean "connecting the pull-up resistor to the communication line" and "connecting the pull-down resistor to the communication line", respectively. The same applies the following description.

The PC 200 is initially set to Unattached.SNK (step S11). At this time, the PC 200 shows the resistor Rd in the communication line and does not generate the prescribed voltages in the power line.

The Power Bank 100 determines that the condition of "Connection Detected" is satisfied by detecting the presence of the connected PC 200, and transitions from Unattached. SRC to AttachWait.SRC (step S2). Further, the Power Bank 100 determines that the condition of "Sink Detected" is satisfied by detecting that the connected PC 200 is waiting for a reply from the SRC, and transitions from AttachWait. SRC to Attached.SRC (step S3). In Attached.SRC, the Power Bank 100 starts supplying the specified voltages to the power lines.

On the other hand, the PC 200 determines that the condition of "Connection Detected" is satisfied by detecting the presence of the connected Power Bank 100, and transitions from Unattached.SNK to AttachWait.SNK (step S12). Further, the PC 200 determines that the condition of "Source Detected" is satisfied by detecting that the connected Power Bank 100 is waiting for a reply from SNK, and transitions from AttachWait.SNK to Attached.SNK (step S13).

When the Power Bank 100 becomes Attached.SRC and the PC 200 becomes AttachWait.SNK, the Power Bank 100 starts supplying power to the PC 200 (step S4), and the PC 200 starts receiving power from the Power Bank 100 (step S14).

Thereafter, when the discharging voltages of the battery in the Power Bank 100 fall to a condition where they cannot operate as a system, the Power Bank 100 shuts down the system and turns Dead Battery.

The system shutdown causes the Power Bank 100 to transition from Attach.SRC to Unattached.SNK (step S5). At this time, the Power Bank 100 shows the resistor Rd in the communication line by the system shutdown, and stops supplying the specified voltage to the power line.

On the other hand, when the PC 200 detects that the connection with the Power Bank 100, which is the SRC, is disconnected due to the system shutdown of the Power Bank 100, the reception of the power is stopped (step S15). The PC 200 transitions from Attached.SNK to UnattachWait. SNK (step S16).

Then the PC 200 detects state in which the connected Power Bank 100 exhibits the resistance Rd in the communication line by the DRP Toggle operation and does not generate the specified voltage in the power line, and transitions from UnattachWait.SNK to UnattachWait.SRC (step S17). That is, the PC 200 switches from SNK to SRC.

Then, the PC 200 determines that the condition of "Connection Detected" is satisfied by detecting the presence of the connected Power Bank 100, and transitions from Unattached.SRC to AttachWait.SRC (step S18).

Further, the PC 200 determines that the condition of "Sink Detected" is satisfied by detecting that the connected Power Bank 100 is waiting for a reply from the SRC (i.e., CC: Rd, VBUS: disable), and transitions from AttachWait.SRC to Attached.SRC (step S19). In Attached.SRC, the PC 200 starts supplying the specified voltages to the power lines. That is, the PC 200 begins powering the Power Bank 100, which causes the Power Bank 100 to recover from the Dead Battery.

Then, by detecting the presence of the connected PC 200, the Power Bank 100 determines that the condition of "Connection Detected" is satisfied, and transitions from Unattached.SNK to AttachWait.SNK (step S6). Further, the Power Bank 100 determines that the condition of "Source Detected" is satisfied, and transitions from AttachWait.SNK to Attached.SNK (step S7).

When the PC 200 becomes Attached.SRC and the Power Bank 100 becomes AttachWait.SNK, the PC 200 starts supplying power to the Power Bank 100 (step S20), and the Power Bank 100 starts receiving power from the PC 200 (step S8).

In the present embodiment, the processing of step S5 and subsequent steps of Power Bank 100 and the processing of step S15 and subsequent steps of PC 200 are solved as problems.

As described above, when the Power Bank 100 and the external device are connected to each other via the USB Type-C interface, if both devices have the DRP function, the SRC and the SNK are alternately switched.

Originally, after the external device has been charged until the battery of the Power Bank 100 is empty, the power supplying and receiving operation should then be halted. However, the power is returned from the external device to the Power Bank 100 between the devices having the DRP function, and the power supplying and receiving operation intended by the user cannot be realized.

The present embodiment provides a configuration and a process for preventing the electric power of the DRP device from automatically flowing back to the Power Bank 100 when the charge operation from the Power Bank 100 to the DRP device is completed in order to solve the above-described new problem. In other words, the present invention provides a mechanism for preventing the power supply direction from reversing and preventing the supplied power from starting to return to the power supply even if the USB cables are left connected after the charging is completed, when the DRP function capable of receiving the power supply is implemented in the devices conforming to the USB Type-C standard capable of supplying and receiving the power by a single port, both of which have the DRP function capable of supplying and receiving the power.

Typically, the Power Bank according to the present embodiment stops the power supply to the connection destination with maintaining the state of the power supply side (SRC) when the power supply to the connection destination is disabled while the power stored in the battery as the power supply side (SRC) is supplied to the connection destination.

By adopting such a configuration, it is possible to avoid an operation in which a role is exchanged between power a supplier and a receiver can be avoided.

In the following explanation, a state in which the power cannot be supplied to the connection destination is referred to as a "Low Battery" state. In this specification, "Low Battery" is the same as "Dead Battery" defined in the USB standard in that the power stored in the battery is lowered and the power cannot be supplied to an external device. However, in the "Low Battery" status, it is assumed that the power that can drive the controller of the own device remains. In other words, "Low Battery" means a state in which power cannot be supplied to a connection destination, but various controls can be performed by the controller.

First Embodiment

As the first embodiment, the most simplified form will be described.

C1: Device Configuration

Figure 4:
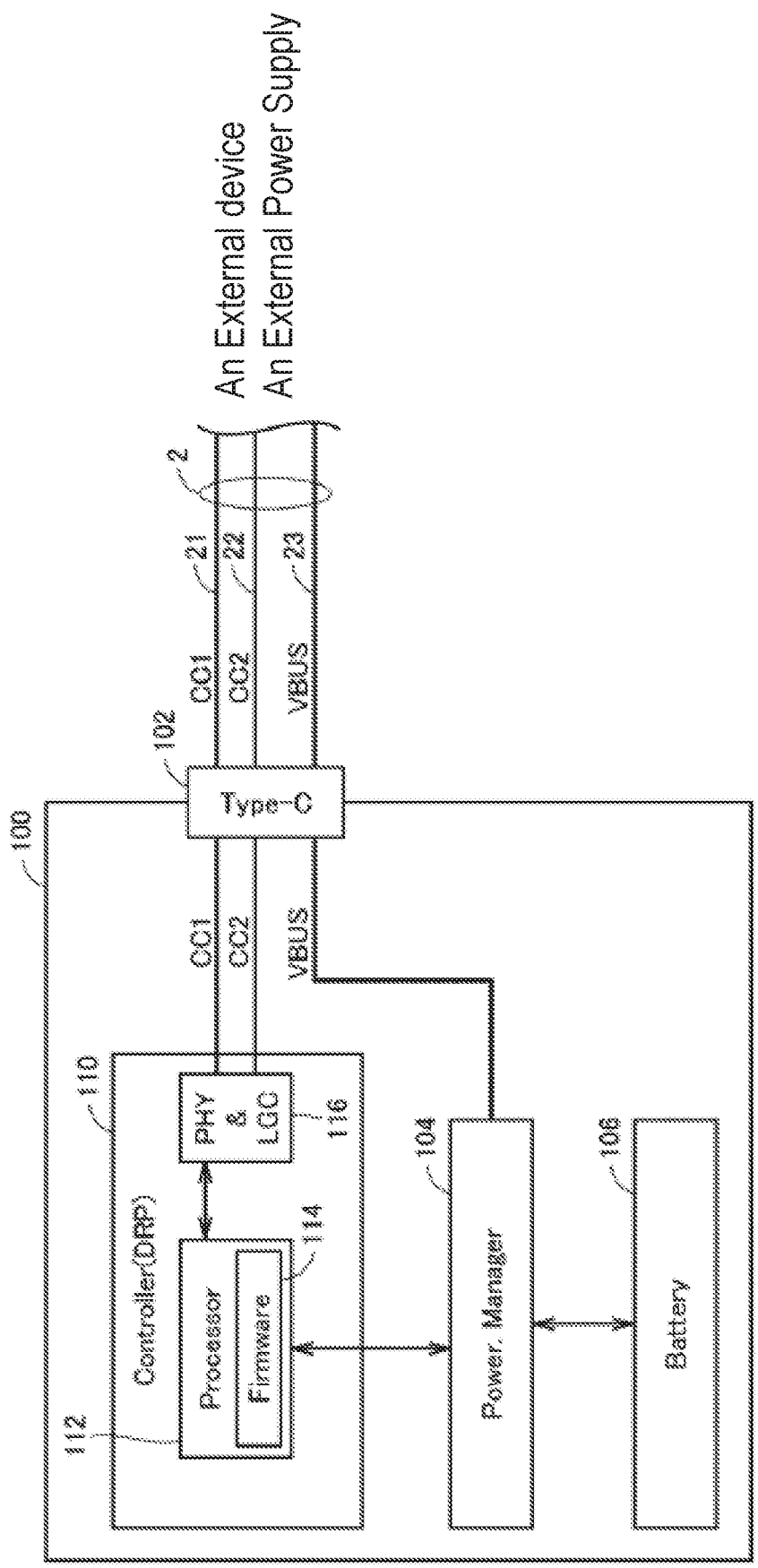
FIG. 4 is a schematic diagram illustrating an exemplary device configuration of a Power Bank according to a first embodiment.

First, an exemplary device configuration of the Power Bank 100 according to the first embodiment will be described. FIG. 4 is a schematic diagram showing an exemplary device configuration of the Power Bank 100 according to the first embodiment.

Referring to FIG. 4, the Power Bank 100 includes, as main components, a connector 102, a power supply manager (Power Manager) 104, a battery 106, and a controller (Controller) 110.

The connector 102 include a port for a USB Type-C interface. The power manager 104 corresponds to a charge/discharge control circuit that controls charge/discharge of the battery 106 in accordance with an instruction from the controller 110. Specifically, the power manager 104 is capable of selectively performing first charging operation of storing the electric power supplied from the external power supply in the battery 106, a second charging operation of storing the electric power supplied from the external device in the battery 106, and a discharging operation of supplying the electric power stored in the battery 106 to the external device.

The battery 106 is a storage battery configured to be chargeable and dischargeable, and for example, a lithium ion secondary battery, a lithium ion polymer secondary battery, a nickel-hydrogen rechargeable battery, or the like is used.

The controller 110 provide a port corresponding to DRP that can be both the power supply side (SRC) and the power reception side (SNK) according to the USB Type-C standard. That is, the controller 110 functions as a DRP, and manages the communication with the connection destination via the USB cable 2 and the power supplying and receiving operation. More specifically, the controller 110 includes a processor 112 and a signal transmission module (PHY & LGC) 116. The processor 112 is connected to the signal transmission module 116 and the power manager 104.

The processor 112 corresponds to a state manager that executes sequences according to the USB Type-C standard. The processor 112 executes the firmware 114, which is an example of a control program, thereby providing the following treatment and functions. That is, the state manager may be realized by the processor 112 executing the firmware 114, which is an example of the control program. Implementation using the processor 112 and the firmware 114 can facilitate sequence modification, version upgrade, and the like. Instead of the software implementation using the processor 112, a hardware implementation as described later may be adopted.

The signal transmission module 116 exchanges a signal with a connection destination via a communication line (a first communication line (CC1) 21 and a second communication line (CC2) 22) in the USB cable 2 in accordance with an instruction from the processor 112 corresponding to the state managing module. The first communication line 21 and the second communication line 22 may be collectively referred to as a "communication line". The detailed configuration of the signal transmission module 116 will be described later.

A processor 112, corresponding to the state manager, is coupled to the power manager 104 for controlling the charging and discharging of the battery 106. An optional control interface may be provided between the processor 112 and the power manager 104. Such a control interface mediates the sending of a control command for controlling the charging and discharging by the power manager 104 in accordance with the instruction from the processor 112. For example, a control signal may be exchanged between the processor 112 and the power manager 104 in accordance with the I2C interface.

Power is exchanged between the battery 106 and external device via the VBUS 23 in the USB cable 2. The USB cable 2 may include a shield wire (not shown).

Figure 5:
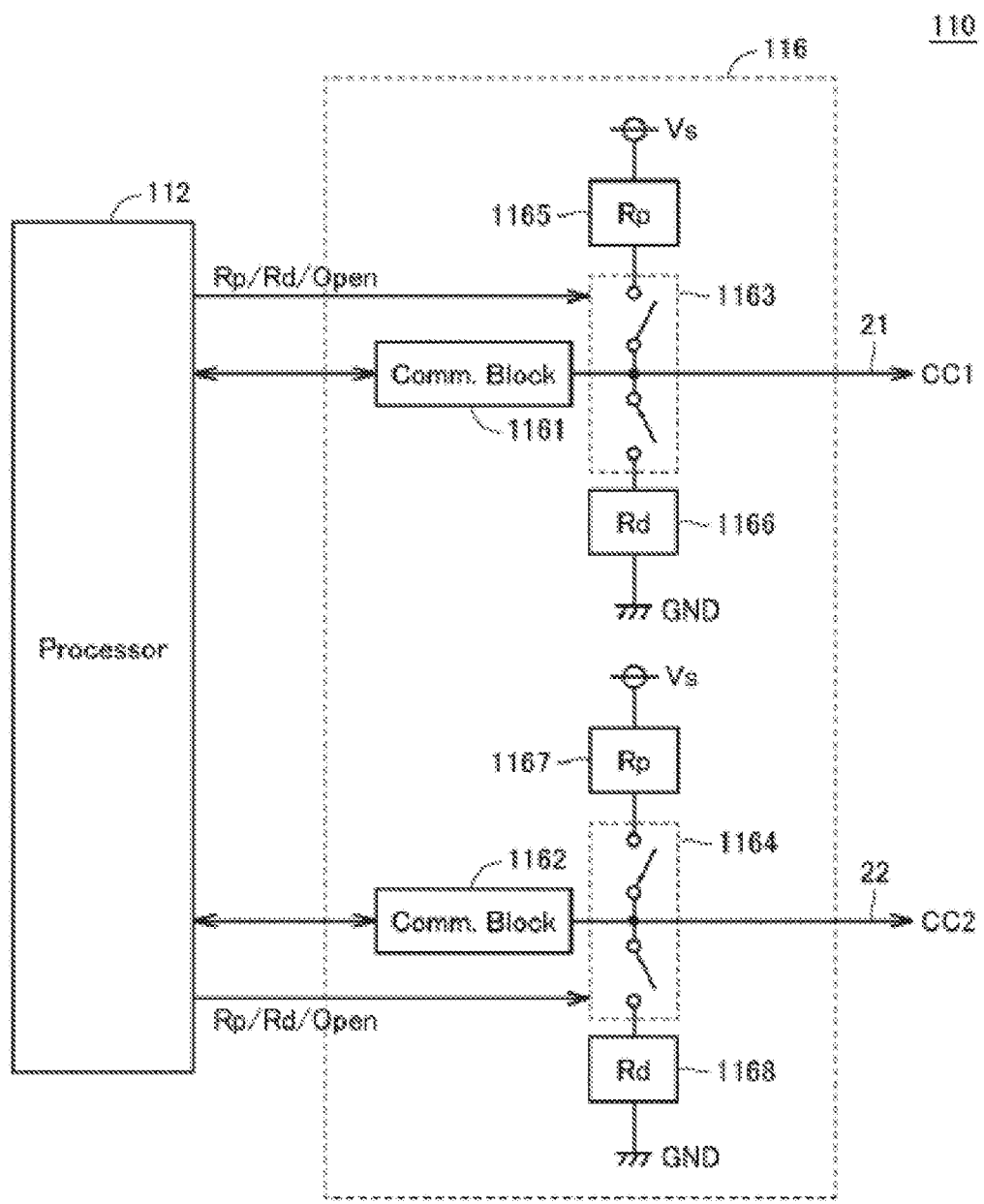
FIG. 5 is a schematic diagram showing an example of a circuit configuration of a controller according to a first embodiment.

FIG. 5 is a schematic diagram showing an example of the circuit configuration of the controller 110 according to the first embodiment. Referring to FIG. 5, the signal transmission module 116 of the controller 110 exchange various control signals via a first communication line 21 (CC1) and a second communication line 22 (CC2).

More specifically, the signal transmission module 116 includes a first communication control block (Comm.Block) 1161 and a second communication control block (Comm. Block) 1162.

The first communication control block 1161 outputs the data received via the first communication line 21 to the processor 112, and transmits the data from the processor 112 via the first communication line 21. Similarly, the second communication control block 1162 outputs the data received via the second communication line 22 to the processor 112 and transmits the data from the processor 112 via the second communication line 22.

The signal transmission module 116 has a resistor connected between the communication line (first communication line 21 and second communication line 22) and the power supply potential Vs and the ground potential GND, respectively, to detect the connection with the connection destination.

Specifically, a pull-up resistor 1165 having a resistance value Rp between the first communication line 21 and the power supply potential Vs is connected to the first communication line 21, and a pull-down resistor 1166 having a resistance value Rd between the first communication line 21 and the ground potential GND is connected to the first communication line 21. Similarly, a pull-up resistor 1167 having a resistance value Rp between the second communication line 22 and the power supply potential Vs is connected to the second communication line 22, and a pull-down resistor 1168 having a resistance value Rd between the second communication line 22 and the ground potential GND is connected to the second communication line 22.

The switches 1163 and 1164 electrically connect/disconnect paths leading from the communication lines (the first communication line 21 and the second communication line 22) to the power supply potential Vs and the ground potential GND. More specifically, the switch 1163 connects/disconnects the pull-up resistor 1165 or the pull-down resistor 1166 to/from the first communication line 21 in accordance with a control signal from the processor 112. Similarly, the switch 1164 electrically connects/disconnects the pull-up resistor 1167 or the pull-down resistor 1168 to/from the second communication line 22 in accordance with a control signal from the processor 112.

By detecting the voltages corresponding to the resistances Rp and Rd generated in the first communication line 21 and the second communication line 22, respectively, the connection between the Power Bank 100 and the connection destination is established.

In this manner, the signal transmission module 116 can selectively connect the pull-up resistors 1165 and 1167 (first resistors) indicating the SRC (power supply side) or the pull-down resistors 1166 and 1168 (second resistors) indicating the SNK (power reception side) to the communication lines (the first communication line 21 and the second communication line 22).

c2: State Transition

Figure 6:
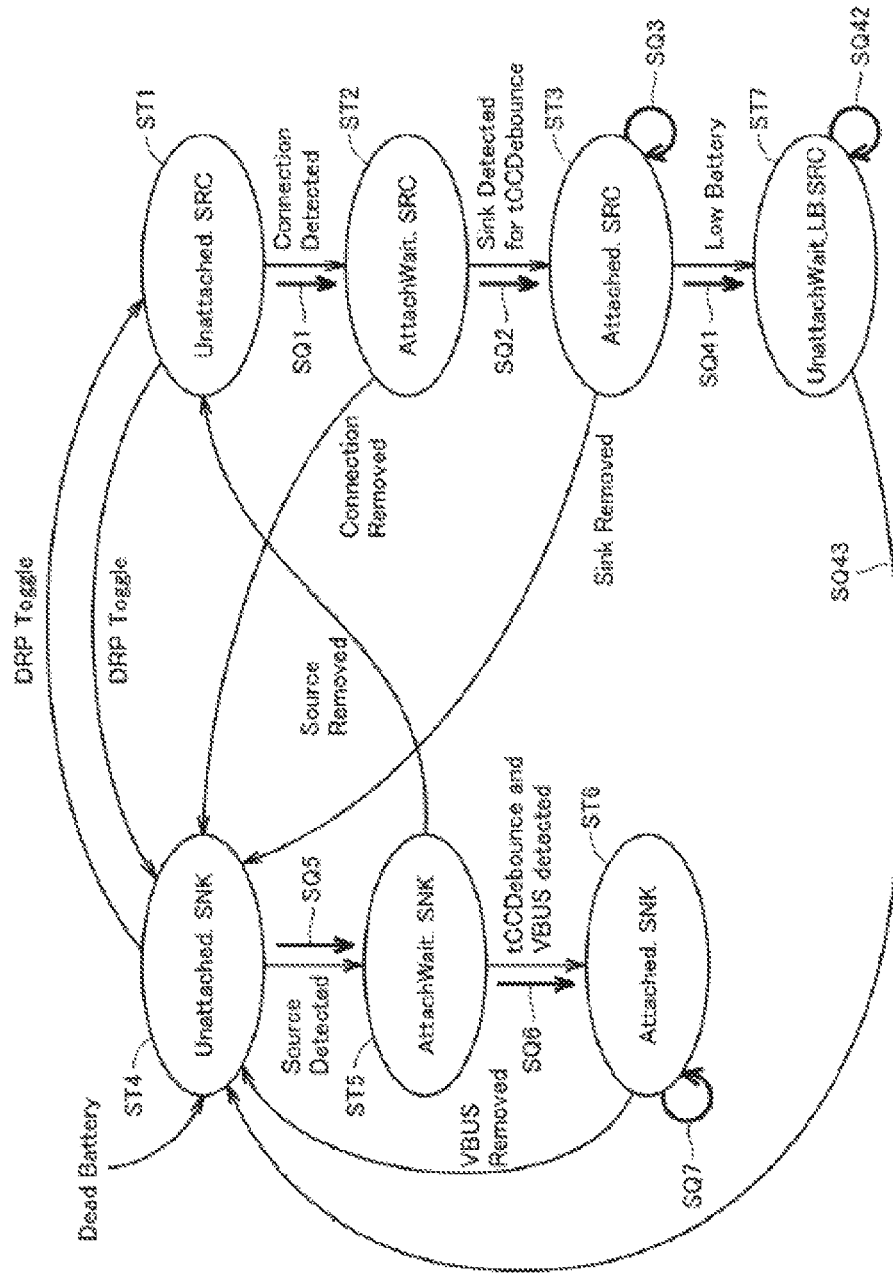
FIG. 6 shows a summary of the state transitions of the Power Bank according to the first embodiment.

Next, the state transitions of the Power Bank 100 according to the first embodiment will be described. FIG. 6 is a diagram showing a main part of state transitions of the Power Bank 100 according to the first embodiment. The state transition shown in FIG. 6 differs from the state transition of the device in charge of the Port Role of DRP according the USB Type-C standard shown in FIG. 2 in that UnatchWait_LB.SRC (ST7) is added. In FIG. 6, the substantially same states the states shown in FIG. 2 are denoted by the same reference numerals. The description of the states described with reference to FIG. 2 will not be repeated.

Transitions to UnattachWait_LB.SRC (ST7) are made on condition that Power Bank 100 becomes Low Battery in Attached.SRC (ST3).

In Attached.SRC (ST3), the Power Bank 100 supplies power to the DRP device. In this situation, the Power Bank 100 transitions to UnattachWait_LB.SRC (ST7) prior to becoming Dead Battery, entry a condition being that the Power Bank 100's battery 106 has dropped to Low Battery, which allows the controller 110 to operate, but is insufficiently powered to the DRP-device.

In UnatchWait_LB.SRC (ST7), the Power Bank 100 maintains the resistivity Rp appearing on the communication line, while not generating the specified voltages on the power line.

Thus, the processor 112 corresponding to the state manager connects the pull-up resistors 1165, 1167 (the first resistors) indicative of the SRC (the power supply side) to the communication line and stops supplying power to the connection destination while the power stored in the battery 106 is being supplied to the DRP device to which the power is connected, while maintaining the pull-up resistors 1165, 1167 (the first resistors) connected to the communication line. By adopting such a configuration, the SNK is not fixed as hardware to the connection waiting state (Unattached. SNK) of the SNK as described in the related art. As a result, it is possible to avoid the occurrence of an operation in which the SRC and the SNK are alternated between devices.

Next, if the DRP device is physically disconnected from the DRP device to which the DRP device is connected when the DRP device is in UnatachWait_LB.SRC (ST7), the state transitions to another state. More specifically, as one of the transition conditions from UnattachWait_LB.SRC (ST7), it is defined that the communication lines are opened (hereinafter, also referred to as "first transition conditions"). That is, similarly to the transition condition from Attached.SRC (ST3), the Power Bank 100 transitions from UnatchWait_LB.SRC (ST7) to Unattached.SNK (ST4) when the state of the communication lines becomes SRC.Open. SRC. Open means a state in which the communication line is open and an infinite resistivity appears in the communication line. As described above, when the communication line is opened, the processor 112 corresponding to the state manager determines that the connection with the connection destination is disconnected.

In Unattached.SNK ST4, the Power Bank 100 shows a resistor Rp on the communication line. That is, when the connection with the connection destination is disconnected, the processor 112 corresponding to the state manager connects the pull-down resistors 1166 and 1168 (second resistors) indicating SNK (power reception side) to the communication lines (the first communication line 21 and the second communication line 22) instead of the pull-up resistors 1165 and 1167 (first resistors) indicating SRC (power supply side).

As described above, in the Power Bank 100 according to the first embodiment, when the remaining capacity of the battery 106 becomes small and the remaining capacity becomes Low Battery, the resistance value Rp appearing on the communication line is maintained, and the supply of the prescribed voltage to the power line is stopped. The Power Bank 100 maintains its status until the connection with the DRP-device is physically disconnected. Thereafter, when the Power Bank 100 is physically disconnected from the DRP connect, the DRP device transitions to a state such that the DRP device exhibits a resistivity Rd on the communication line.

Even if power cannot be supplied from the Power Bank 100 to the DRP device by adding UnatchWait_LB.SRC (ST7), which is such a new state, the Power Bank 100 is not fixed to the connection waiting state of the SNK (Unattached.SNK (ST4)), so that the DRP device does not switch from the SNK to the SRC, and it is possible to avoid the occurrence of an operation of depriving the previously charged DRP device of the power.

As a specific sequence, when the Power Bank 100 is turned Low Battery after the Power Bank 100 starts supplying power to the PC 200, the Power Bank 100 transitions from Attached.SRC (ST3) to UnattachWait_LB.SRC (ST7) (sequence SQ41).

In this state, the Power Bank 100 maintains its state until the connection with the DRP device is physically disconnected (sequence SQ42). If it is determined that the connection with the DRP device is physically disconnected, the Power Bank 100 transitions from UnatachWait_LB.SRC (ST7) to Unattached.SNK (ST4) (sequence SQ43). The subsequent processing is the same as the state transition shown in FIG. 2.

c3: Treatment Sequence

Next, according to the first embodiment, an example of a processing sequence of a power supplying and receiving operation executed between a Power Bank 100 and a PC 200, which is an example of a DRP device, will be described.

Figure 7:
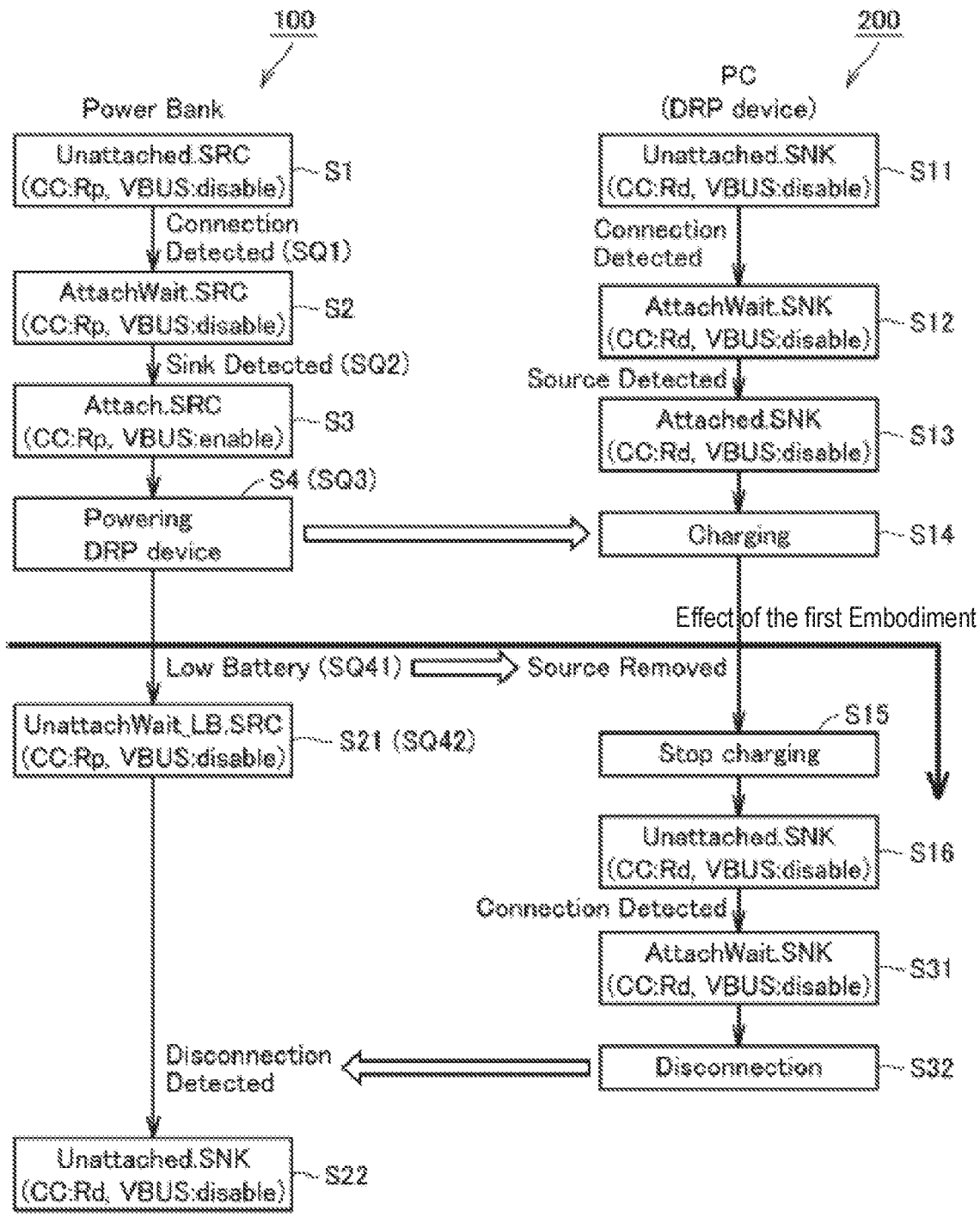
FIG. 7 is a sequence chart illustrating a processing sequence pertaining to a power supplying and receiving operation executed between a Power Bank according to the first embodiment and a PC.

FIG. 7 is a sequence chart showing a process sequence relating to the power supplying and receiving operation executed between the Power Bank 100 and the PC 200 according to the first embodiment. In the sequence chart shown in FIG. 7, the substantially same processing as the sequence chart shown in FIG. 3 is denoted by the same reference numerals. The description of the processing described with reference to FIG. 3 will not be repeated.

FIG. 7 shows a process sequence when power is supplied from the Power Bank 100 to the PC 200, similarly to the process sequence shown in FIG. 3. Specifically, the Power Bank 100 transitions from Unattached.SRC to Attach.SRC via AttachWait.SRC (steps S1, S2, S3), and starts supplying power to the PC 200 (step S4).

On the other hand, the PC 200 transitions from Unattached.SNK to Attach.SNK via AttachWait.SNK (steps S11, S12, S13), and starts receiving power from the Power Bank 100 (step S14).

In this manner, the controller 110 of the Power Bank 100 connects the pull-up resistors 1165 and 1167 (first resistors; resistance values Rp) indicating the SRC (power supply side) to the communication lines, and supplies the electric power stored in the battery 106 to the connection destination.

Thereafter, when the discharging voltage of the battery 106 in the Power Bank 100 drops to a predetermined value, the Power Bank 100 turns Low Battery, and the discharging voltage transitions from Attach.SRC to UnatachWait_LB.SRC (step S21). In this condition, the power from the Power Bank 100 to the PC 200 is stopped. However, the Power Bank 100 maintains the state of the SRC.

On the other hand, the PC 200 stops receiving electric power by stopping supplying electric power from the Power Bank 100 (step S15). Then, the PC 200 transitions from Attached.SNK to UnattachWait.SNK (step S16).

Thus, when the power supply to the connection destination becomes impossible during power supply, the controller 110 of the Power Bank 100 stops supplying power to the connection destination while maintaining the pull-up resistors 1165, 1167 (first resistors; resistance value Rp) indicating the SRC (power supply side) connected to the communication line.

Further, by detecting the presence of the connected Power Bank 100, the PC 200 determines that the condition of "Connection Detected" is satisfied, and transitions from Unattached.SNK to AttachWait.SNK (step S31).

The Power Bank 100 maintains UnattachWait_LB.SRC and the PC 200 maintains AttachWait.SNK until the Power Bank 100 and PC 200 connects are physically disconnected.

If it is determined that the connection between the Power Bank 100 and the PC 200 is physically disconnected (step S32), the Power Bank 100 detects that the connection destination PC 200 is no longer present, thereby determining that the condition of "Disconnection Detected" is satisfied, and transitions from UnattachWait_LB.SRC to Unattached.SNK (step S22).

According to the first embodiment, it is possible to avoid a situation in which the Power Bank 100 draws power from the PC 200 by the above-described process sequences. In other words, according to the first embodiment, the above-described problem is solved by optimizing the treatment of step S21 and subsequent steps of the Power Bank 100 and the processing of step S15 and subsequent steps of the PC 200.

c4: Operation Example

Next, according to the first embodiment, an example of a supplying and receiving power operation performed between a Power Bank 100 and a PC 200, which is an example of a DRP device, will be described.

FIG. 8 is a schematic diagram showing an exemplary operation of the power supplying and receiving operation performed between the Power Bank 100 and the PC 200 according to the first embodiment. FIG. 8 shows an exemplary operation when power is supplied from the Power Bank 100 to the PC 200 in the same manner as in FIG. 1.

Referring to FIG. 8A, the Power Bank 100 starts supplying power to the PC 200. Thereafter, as shown in FIG. 8B, when the Power Bank 100 is turned Low Battery, the power supply from the Power Bank 100 to the PC 200 is stopped (the VBUS is turned disable), but the Power Bank 100 maintains the SRC-state. The Power Bank 100 maintains the state of the SRC until the connection between the Power Bank 100 and the DRP is physically disconnected.

As shown in FIG. 8C, when it is determined that the Power Bank 100 and the PC 200 (DRP device) are physically disconnected, the Power Bank 100 is switched from the SRC to the SNK.

By switching to SNK, as shown in FIG. 8D, the Power Bank 100 can charge the battery 106 receiving electric power supplied from an external power supply such as the power supply adapter 300.

As described above, according to the first embodiment, the Power Bank 100 transitions to UnatchWait_LB.SRC when it is turned Low Battery, and by turning disable the VBUS while maintaining the resistance value of the communication lines at the resistance value Rp, it is possible to maintain the state without taking power from the DRP device (PC 200) which is the power supply target, and to receive the power supplied from the external power supply after it is determined that the connection with the DRP device is physically disconnected.

c5: Processing Procedure

Figure 9:
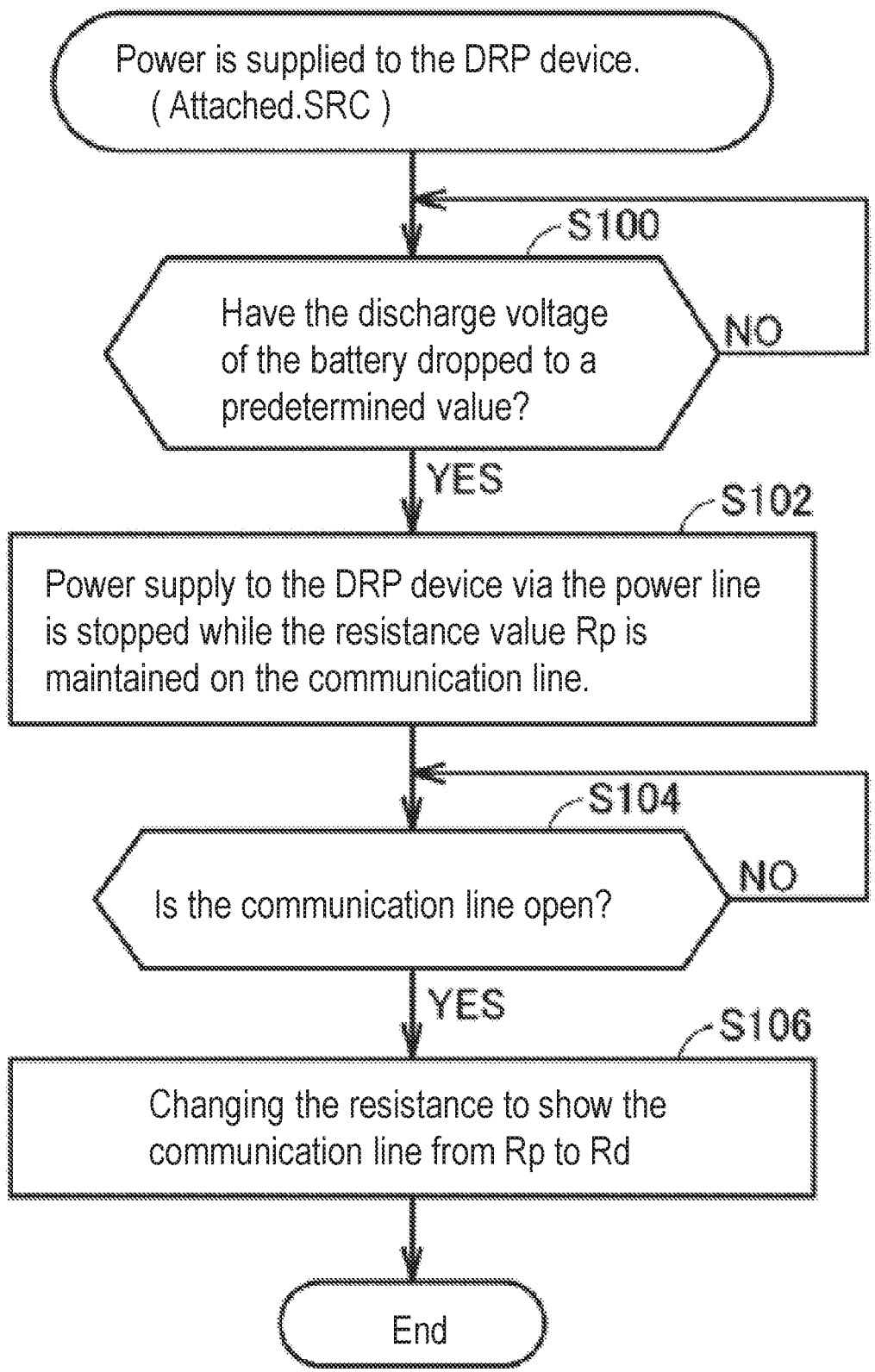
FIG. 9 is a flowchart illustrating a processing procedure pertaining to a power supplying operation of a Power Bank according to the first embodiment.

FIG. 9 is a flow chart showing the processing procedures pertaining to the power supply operation of the Power Bank 100 in accordance with the first embodiment. The steps of the Power Bank 100 shown in FIG. 9 are typically realized by the processor 112 of the controller 110 executing the firmware 114, which is a control program. Therefore, the execution subject of each step shown in FIG. 9 is typically the processor 112.

Referring to FIG. 9, the processor 112 determines whether the discharging voltage of the battery 106 has dropped to predetermined voltage while the power is supplied to the DRP device in the Attached.SRC (step S100). If the discharging voltage of the battery 106 has not decreased to the predetermined value (NO in step S100), the processor 112 repeats the process of step S100.

If the discharging voltage of the battery 106 has dropped to a predetermined value (YES in step S100), the processor 112 stops the power supply to the DRP device via the power supply line while maintaining the resistance value Rp on the communication lines (the first communication line 21 and the second communication line 22) (step S102).

Then, the processor 112 determines whether or not the communication lines (the first communication line 21 and the second communication line 22) are open (step S104). If the communication lines are not open (NO in step S104), the processor 112 repeats the process of step S104.

If the communication line is open (YES in step S104), the processor 112 changes the resistance value shown in the communication lines (the first communication line 21 and the second communication line 22) from Rp to Rd (step S106), and terminates the power supply operation to the DRP devices.

c6: Benefits

A Power Bank 100 according to the first embodiment detects a Low Battery condition, stops supplying power to the DRP device, displays a resistance value Rp on the communication line, and maintains a Source (SRC) condition before the discharge voltage of the battery 106 is lowered (Dead Battery) until it cannot operate as stem. As a result, it is possible to prevent the DRP device that has been supplied with power from being switched to the Source DRP device. Since the DRP device does not switch to Source, it is possible to avoid an operation in which the Power Bank 100 draws power from the previously charged DRP device.

Further, in the Power Bank 100 according to the first embodiment, when it is determine that the connection with the DRP device is physically disconnected, the connection is switched from Source (SRC) to Sink (SNK), so that the battery 106 can be charged by being supplied with electric power from an external power supply such as the power supply adapter 300 in accordance with the USB Type-C standard.

Second Embodiment

Next, as the second Embodiment, a configuration will be described in which the transition condition from UnatachWait_LB.SRC (ST7) adopted in the first Embodiment is different. The configuration and the process except for the condition for transitioning from UnatachWait_LB.SRC (ST7) are the same as those in the first embodiment, and therefore detailed descriptions thereof will not be repeated.

d1: State Transition

Figure 10:
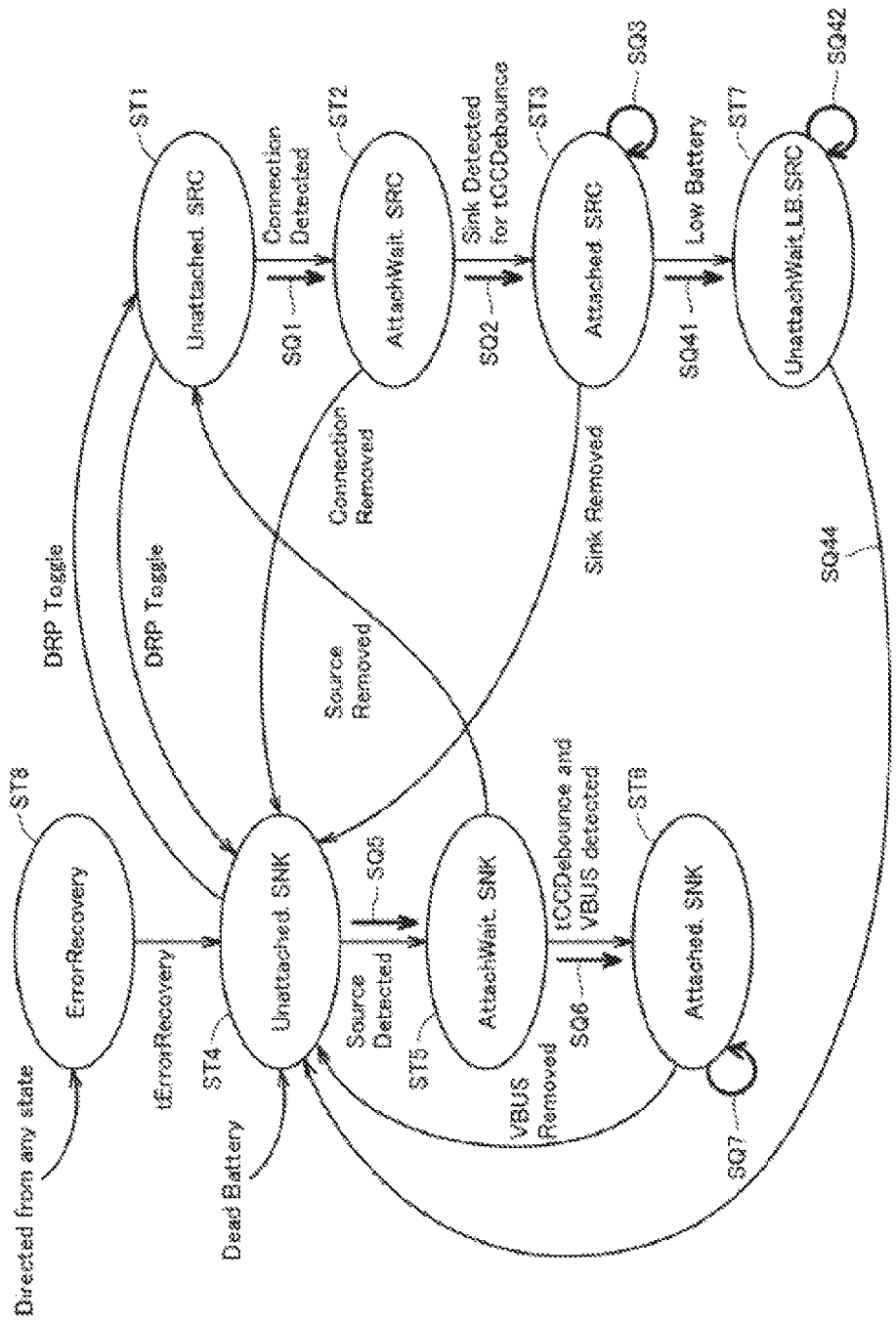
FIG. 10 shows a summary of the state transitions of the Power Bank according to the second embodiment.

The state transitions of the Power Bank 100 according to the second embodiment are described. FIG. 10 is a diagram showing a main part of state transitions of the Power Bank 100 according to the second embodiment. The state transition shown in FIG. 10 differs the state transition of the Power Bank 100 according to the first embodiment shown in FIG. 6 in that the state of ErrorRecovery (ST8) is considered. In FIG. 10, the substantially same states as the states shown in FIG. 6 are denoted by the same reference numerals. The description of the states described with reference to FIG. 6 will not be repeated.

ErrorRecovery (ST8) is state that transitions when an optional condition is satisfied, and executes a restoration process when it is determined that an anomaly has occurred. More specifically, in ErrorRecovery (ST8), after the communication line is kept open for a predetermined period (tErrorRecovery), the communication line transitions to Unattached.SNK (ST4) or Unattached.SRC (ST1). At this time, a DRP Toggle operation for making state transition between Unattached.SNK (ST4) and Unattached.SRC (ST1) is also executed.

Here, if the DRP device connected to the Power Bank 100 transitions to ErrorRecovery (ST8) by satisfying some states, the communication line of the connected DRP device becomes open. That is, from the point of view in the Power Bank 100, it is determined that the state of the connected communication lines has become SRC.Open.

When the Power Bank 100 is in UnatchWait_LB.SRC (ST7), if the DRP device of the connection destination transitions to ErrorRecovery (ST8), the Power Bank 100 determines that the connection with the DRP device has been physically disconnected (erroneously), and therefore transitions to Unattached.SNK (ST4) and switches from SRC to SNK.

Therefore, in the second embodiment, only when it is determined that the USB cable 2 connecting the Power Bank 100 and the DRP device are physically pulled out, the Power Bank 100 transitions from the UnatchWait_LB.SRC (ST7) to the Unattached.SNK (ST4) (sequence SQ44).

That is, in the second embodiment, a transition condition different from the transition condition (the first transition condition) from the UnattachWait_LB.SRC (ST7) adopted in the first embodiment is adopted to prevent erroneous state transition.

As described above, even if the USB cable 2 connecting the Power Bank 100 and the DRP device are not physically pulled out, in the transition condition adopted in the first embodiment, it is decided that the USB cable 2 connecting the Power Bank 100 and the DRP device are not physically pulled out by the transition condition to ErrorRecovery (ST8) or the DRP Toggle operation, so that, in order to ensure that the connection is actually physically pulled out, a transition condition (hereinafter referred, as a "second transition condition") as described below is adopted.

The second transient condition: the state of (a voltage appearing at CC1≠vRd, and a voltage appearing at CC2≠vRd) continues for more than the time (=tErrorRecovery+tDRP), where tErrorRecovery means the time to keep the communication lines open in ErrorRecovery (ST8). The tDRP means the time required to execute a DRP Toggle operation once. According to the USB Type-C standard, the tErrorRecovery is set to 240 ms and the tDRP is set to 100 ms.

Further, vRd means the voltages appearing on the communication lines when the own device is Source (SRC) and the connected DRP device is Sink (SNK).

That is, the processor 112 corresponding to the state manager determines that the connection with the connection destination is disconnected when the voltage different from the voltage that should appear on the communication line continues for a predetermined time on the communication line in the case where the self-controller is the SRC (power supply side) and the connection destination is the SNK (power reception side). Here, the predetermined time may be set to be equal to or longer than the sum of the time required for maintaining the open communication lines in the Error-Recovery state and the time required for the DRP Toggle operation.

In other words, the second transition condition means that, when viewed from the Power Bank 100, a voltage that differs from the voltage (vRd) appearing on the communication lines corresponding to the states of the connected DRP devices continues beyond the time required for the transition to the ErrorRecovery (ST8) or the time required for the DRP Toggle operation.

The Power Bank 100 according to the second embodiment makes a transition to Unattached.SNK (ST4) only when the above-mentioned second transition condition is satisfied in UnattachWait_LB.SRC (ST7) (sequence SQ44).

By adopting the second transition condition as described above, even if a transition to ErrorRecovery (ST8) or a DRP Toggle operation occurs in the connected DRP device, the Power Bank 100 does not erroneously determine that the connection with the DRP device has been physically disconnected.

Next, an example of a processing sequence of the power supplying and receiving treatment executed between the Power Bank 100 and the PC 200, which is an example of the DRP device, according to the second embodiment will be described.

Figure 11:
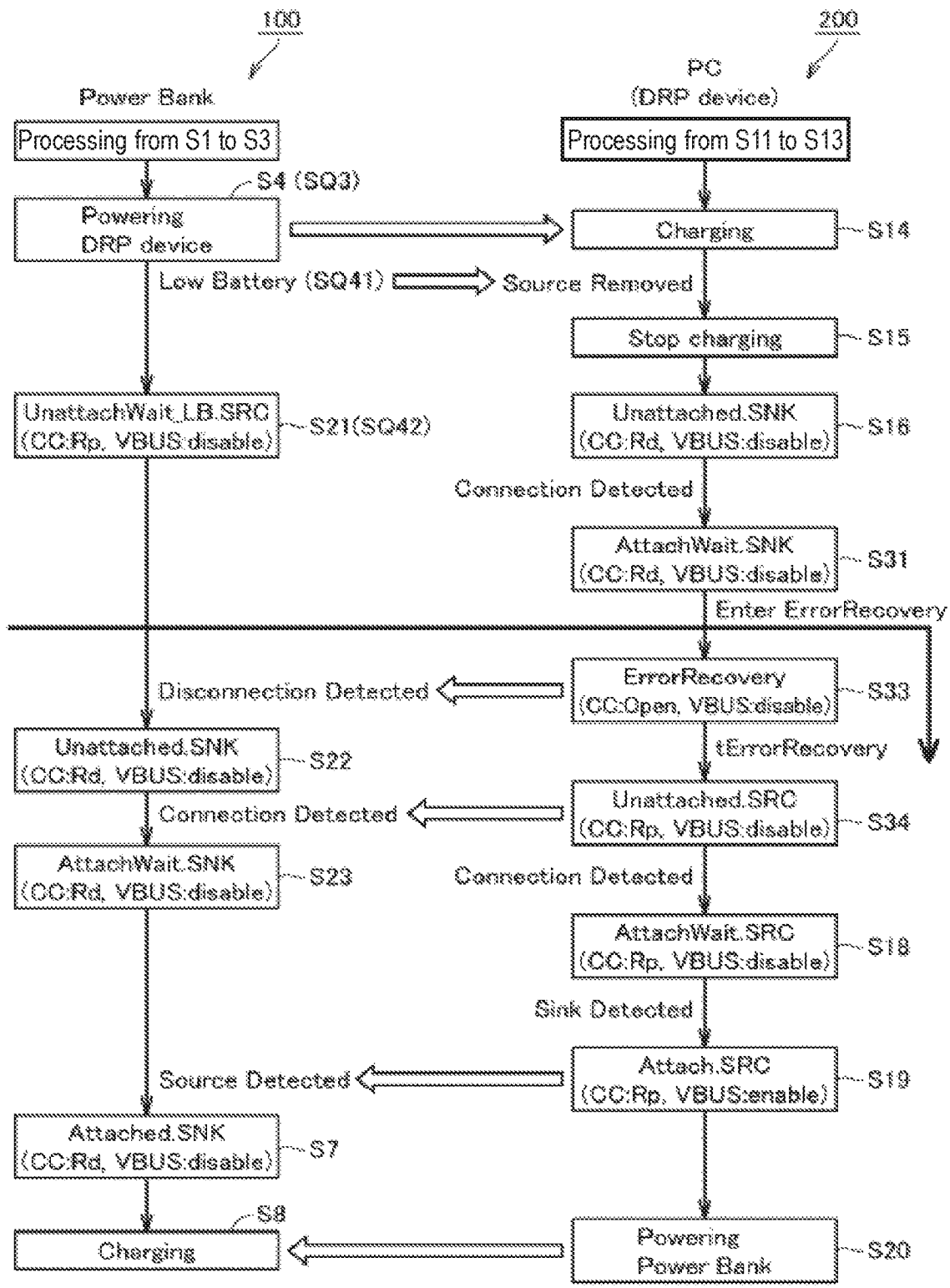
FIG. 11 is a sequence chart illustrating a processing sequence when an Error Recovery occurs in a power supplying and receiving operation executed between a Power Bank according to the first embodiment and a PC.

FIG. 11 is a sequence chart showing a process sequence when an ErrorRecovery occurs in the power supplying and receiving operation executed between the Power Bank 100 and the PC 200 according to the first embodiment. In the sequence chart shown in FIG. 11, the substantially same processing as that of the sequence chart shown in FIG. 3 or FIG. 7 is denoted by the same reference numerals. The description of the processing described with reference to FIG. 3 or FIG. 7 will not be repeated.

Similarly to FIG. 7, FIG. 11 shows a process sequence when power is supplied from the Power Bank 100 to the PC 200. Specifically, the Power Bank 100 transitions from Unattached.SRC to Attach.SRC via AttachWait.SRC (steps S1, S2, S3), and starts supplying power to the PC 200 (step S4).

On the other hand, the PC 200 transitions from Unattached.SNK to Attach.SNK via AttachWait.SNK (steps S11, S12, S13), and starts receiving power from the Power Bank 100 (step S14).

Thereafter, when the discharging voltage of the battery 106 in the Power Bank 100 drops to a predetermined value, the Power Bank 100 turns Low Battery, and the discharging voltage transitions from Attach.SRC to UnatachWait_LB.SRC (step S21). In this condition, the power from the Power Bank 100 to the PC 200 is stopped. However, the Power Bank 100 maintains the state of the SRC.

On the other hand, the PC 200 stops receiving electric power by stopping supplying electric power from the Power Bank 100 (step S15). Then the PC 200 transitions from Attached.SNK to UnattachWait.SNK (step S16). Further, by detecting the presence of the connected Power Bank 100, the PC 200 determines that the condition of "Connection Detected" is satisfied, and transitions from Unattached.SNK to AttachWait.SNK (step S31).

In this condition, it is assumed that PC 200 transitions to ErrorRecovery. In other words, the PC 200 shifts to the ErrorRecovery when some condition is satisfied (step S33). In the ErrorRecovery, the state of the PC 200 communication lines is SRC.Open.

On the other hand, when the state of the PC 200 communication lines becomes SRC.Open, the Power Bank 100 determines that the condition of "Disconnection Detected" is satisfied, and transitions from UnattachWait_LB.SRC to Unattached.SNK (step S22).

The PC 200 transitions to Unattached.SRC after the tErrorRecovery has elapsed (step S34). That is, the PC 200 switches from SNK to SRC.

Then, the PC 200 determines that the condition of "Connection Detected" is satisfied by detecting the presence of the connected Power Bank 100, and transitions from Unattached.SRC to AttachWait.SRC (step S18). Further, the PC 200 determines that the condition of "Sink Detected" is satisfied by detecting that the connected Power Bank 100 is waiting for a reply from the SRC (i.e., CC: Rd, VBUS: disable), and transitions from AttachWait.SRC to Attached.SRC (step S19).

On the other hand, the Power Bank 100 determines that the condition of "Source Detected" is satisfied, and transitions from AttachWait.SNK to Attached. SNK (step S7).

When the PC 200 becomes Attached.SRC and the Power Bank 100 becomes AttachWait.SNK, the PC 200 starts supplying power to the Power Bank 100 (step S20), and the Power Bank 100 starts receiving power from the PC 200 (step S8).

As described above, when the Power Bank 100 is UnattachWait_LB.SRC, if the connected DRP device transitions to ErrorRecovery for some reasons, the Power Bank 100 may erroneously determine that the connection with the DRP device has been physically disconnected, and may transition to UnAttached.SNK. In such a situation, the DRP device transitions to Attach.SRC via Unattached.SRC, and the roles of the supplying and receiving power are unintentionally reversed.

In the second embodiment, by adopting the second transition condition as described above, it is possible to avoid erroneous determination that the connection is physically disconnected even if the DRP device of the connection destination transitions to the ErrorRecovery DRP device.

Figure 12:
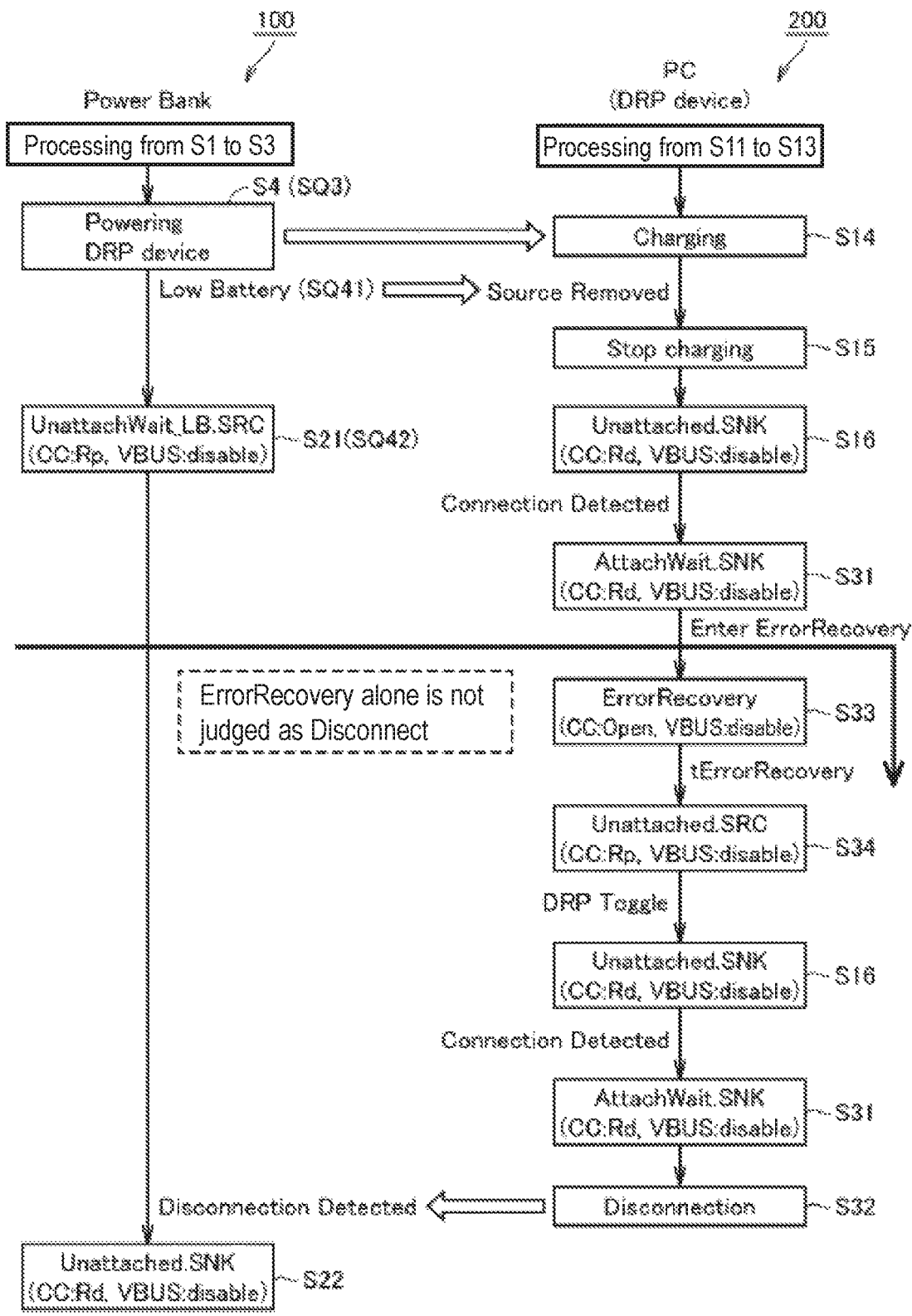
FIG. 12 is a sequence chart illustrating a processing sequence pertaining to a power supplying and receiving operation executed between a Power Bank according to the second embodiment and a PC.

FIG. 12 is a sequence chart showing a process sequence relating to the power supplying and receiving operation executed between the Power Bank 100 and the PC 200 according to the second embodiment. In the sequence chart shown in FIG. 12, the substantially same processing as the sequence chart shown in FIG. 3, FIG. 7, or FIG. 11 is denoted by the same reference numerals. The description of the processing described with reference to FIG. 3, FIG. 7, or FIG. 11 will not be repeated.

Similarly to FIG. 11, FIG. 12 shows a process sequence when power is supplied from the Power Bank 100 to the PC 200. Specifically, the Power Bank 100 transitions from Unattached.SRC to Attach.SRC via AttachWait.SRC (steps S1, S2, S3), and starts supplying power to the PC 200 (step S4).

On the other hand, the PC 200 transitions from Unattached.SNK to Attach.SNK via AttachWait.SNK (steps S11, S12, S13), and starts receiving power from the Power Bank 100 (step S14).

In this manner, the controller 110 of the Power Bank 100 connects the pull-up resistors 1165 and 1167 (first resistors; resistance values Rp) indicating the SRCs (power supply sides) to the communication lines, and supplies the electric power stored in the battery 106 to the connection destination.

Thereafter, when the discharging voltage of the battery 106 in the Power Bank 100 drops to a predetermined value, the Power Bank 100 turns Low Battery, and the discharging voltage transitions from Attach.SRC to UnatachWait_LB.SRC (step S21). In this condition, the power from the Power Bank 100 to the PC 200 is stopped. However, the Power Bank 100 maintains the state the SRC.

On the other hand, the PC 200 stops receiving electric power by stopping supplying electric power from the Power Bank 100 (step S15). Then the PC 200 transitions from Attached.SNK to UnattachWait.SNK (step S16).

In this manner, the controller 110 of the Power Bank 100 connects the pull-up resistors 1165 and 1167 (first resistors; resistance values Rp) indicating the SRCs (power supply sides) to the communication lines, and supplies the electric power stored in the battery 106 to the connection destination.

In this condition, it is assumed that PC 200 transitions to ErrorRecovery. In other words, the PC 200 shifts to the ErrorRecovery when some conditions are satisfied (step S33). In the ErrorRecovery, the state of the PC 200 communication lines is SRC.Open. Then the PC 200 transitions to Unattached.SRC after the tErrorRecovery has elapsed (step S34). Furthermore the PC 200 transitions from UnattachWait.SRC to UnattachWait.SNK by the DRP Toggle operation (step S16). At this time, the PC 200 shows the resistor Rd in the communication line and does not generate the prescribed voltages in the power line.

For ErrorRecovery, the time required for the transition from ErrorRecovery (step S33) to Unattached.SRC (step S34) is tErrorRecovery, and the time required for the transition from Unattached.SRC (step S34) to UnattachWait.SNK (step S16) is tDRP. That is, although the state of the communication line in the PC 200 becomes SRC.Open by the transition to the ErrorRecovery, the resistor Rd appears on the communication line after the lapse of the time (=tErrorRecovery+tDRP). That is, the voltage of vRd appears on the communication line.

Therefore, the states (the voltage appearing at CC1≠vRd and the voltage appearing at CC2≠vRd) do not continue for more than the period (=tErrorRecovery+tDRP), and the transient condition is not satisfied. As a result, the Power Bank 100 does not erroneously determine that the connection with the DRP device has been physically disconnected, and maintains UnattachWait_LB.SRC.

On the other hand, the PC 200 determines that the condition of "Connection Detected" is satisfied by detecting the presence of the connected Power Bank 100, and transitions from Unattached.SNK to AttachWait.SNK (step S31).

Finally, when the connection between the Power Bank 100 and the PC 200 is actually physically disconnected (step S32), the Power Bank 100 determines that the transition condition according to the second embodiment is satisfied, and transitions from UnattachWait_LB.SRC to Unattached.SNK (step S22).

As described above, when the Power Bank 100 is UnattachWait_LB.SRC, even if the connected DRP device transitions to ErrorRecovery for some reasons and a subsequent transition to Unattached.SRC occurs, the Power Bank 100 is maintained at UnattachWait_LB.SRC. As a result, the DRP device is also finally shifted to and maintained at AttachWait.SNK, so that the DRP device can be prevented from unintentionally reversing the roles of supplying and receiving power.

d3: Operation Example

Next, according to the second embodiment, an example of a power supplying and receiving operation performed between a Power Bank 100 and a PC 200, which is an example of a DRP device, will be described.

Figure 13A:
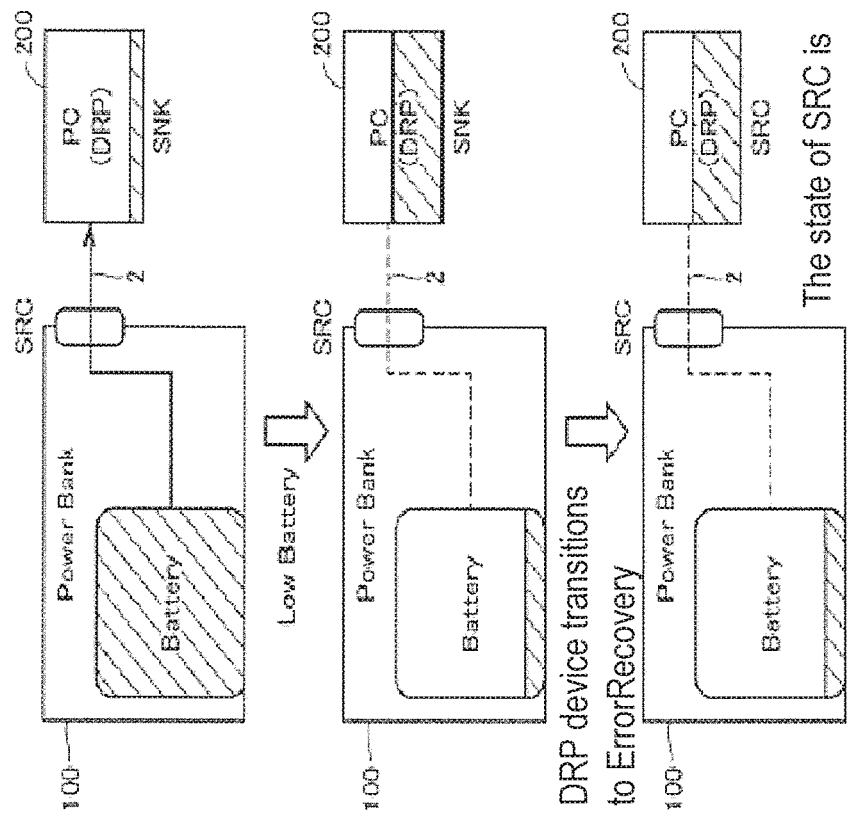
FIG. 13A and FIG. 13B are schematic views illustrating an example of a power supplying and receiving operation performed between a Power Bank according to the second embodiment and a PC.
Figure 13B:
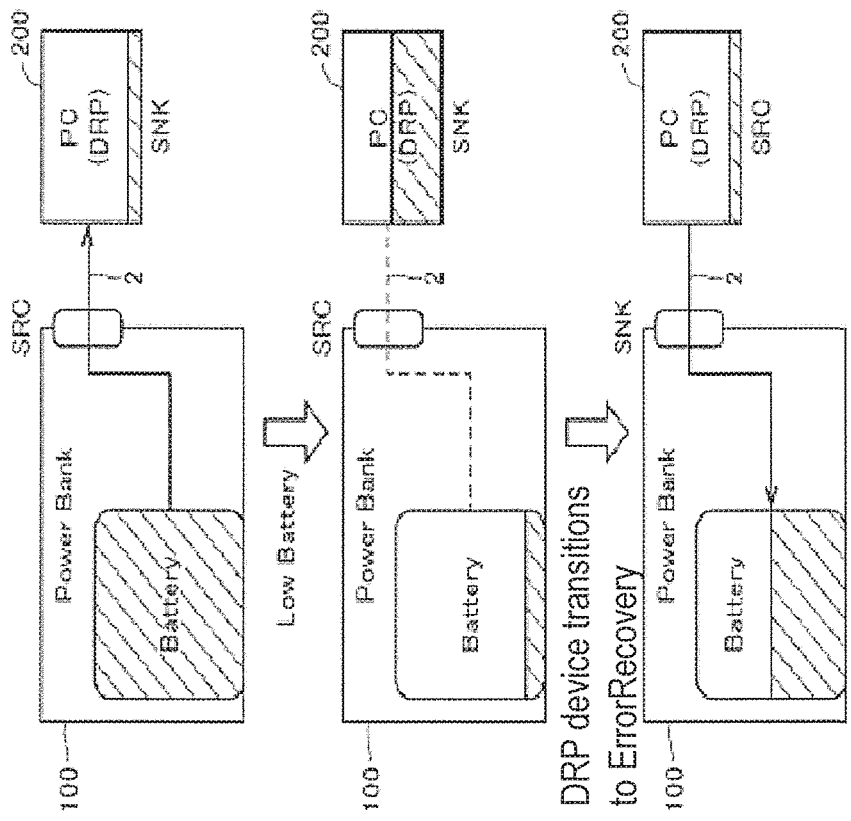

FIG. 13 is a schematic diagram showing an exemplary operation of the power supplying and receiving operation performed between the Power Bank 100 and the PC 200 according to the second embodiment. FIG. 13A shows an operation example when an ErrorRecovery occurs in the power supplying and receiving operation executed between the Power Bank 100 and the PC 200 according to the first embodiment as a comparative example, and FIG. 13B shows an operation example when an ErrorRecovery occurs in the power supplying and receiving operation executed between the Power Bank 100 and the PC 200 according to the first embodiment.

Referring to FIG. 13A, when the Power Bank 100 is turned Low Battery during the power supply from the Power Bank 100 to the PC 200 according to the first embodiment, the power supply from the Power Bank 100 to the PC 200 is stopped. Here, when the PC 200 transitions to ErrorRecovery, the state of the communication lines becomes SRC.Open. As a result, it is determined that the transition condition employed in the first embodiment is satisfied, so that the roles of supplying and receiving power are unintentionally reversed between the Power Bank 100 and the PC 200.

On the other hand, referring to FIG. 13B, when the Power Bank 100 is turned Low Battery during the power supply from the Power Bank 100 to the PC 200 according to the second embodiment, the power supply from the Power Bank 100 to the PC 200 is stopped. Here, even if the PC 200 transitions to the ErrorRecovery, the transition condition employed in the second embodiment is not satisfied, so that it is possible to avoid a situation in which the roles of supplying and receiving power are unintentionally reversed between the Power Bank 100 and the PC 200.

d4: Treatment Procedure

Figure 14:
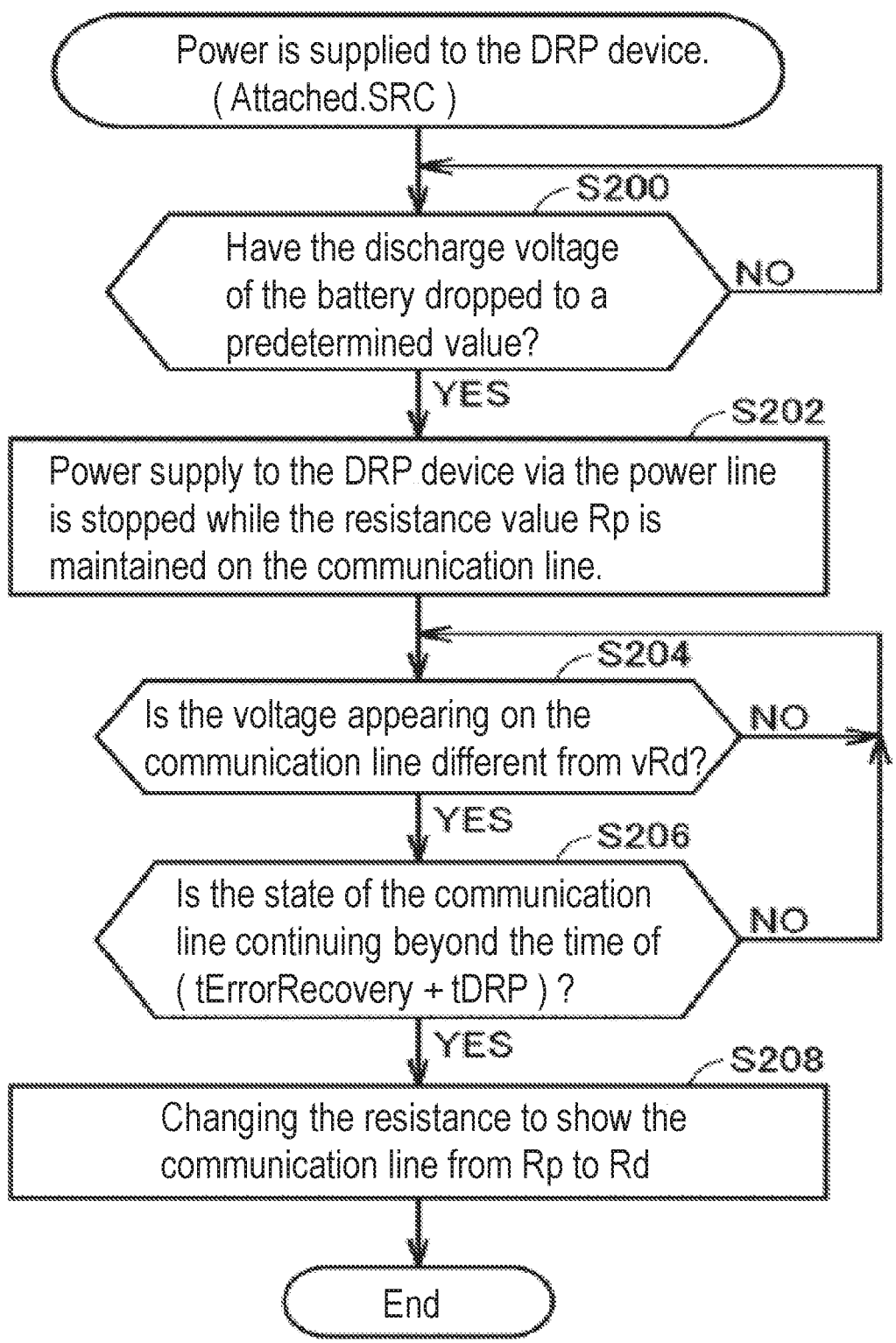
FIG. 14 is a flowchart illustrating a processing procedure pertaining to a power supplying operation of a Power Bank according to the second exemplary embodiment.

FIG. 14 is a flowchart illustrating a processing procedure pertaining to a power supplying operation of a Power Bank 100 according to the second exemplary embodiment. The steps of the Power Bank 100 shoran in FIG. 14 are typically realized by the processor 112 of the controller 110 executing the firmware 114, which is a control program. Therefore, the execution subject of each step shown in FIG. 14 is typically the processor 112.

Referring to FIG. 14, the processor 112 determines whether the discharging voltage of the battery 106 has dropped to a predetermined voltage while the power is supplied to the DRP device in the Attached.SRC (step S200). If the discharging voltage of the battery 106 has not decreased to the predetermined value (NO in step S200), the processor 112 repeats the process of step S200.

If the discharging voltage of the battery 106 has dropped to a predetermined value (YES in step S200), the processor 112 stops the power supply to the DRP device via the power supply line while maintaining the resistance value Rp on the communication lines (the first communication line 21 and the second communication line 22) (step S202).

Then, the processor 112 determines whether or not the voltages appearing on the communication lines (the first communication line 21 and the second communication line 22) are different from vRd (step S204). If the voltages appearing on the communication lines (the first communication line 21 and the second communication line 22) substantially coincide with vRd (NO in step S204), the processor 112 repeats the process of step S204.

If the voltages appearing on the communication lines (the first communication line 21 and the second communication line 22) are different from vRd (YES in step S204), the processor 112 determines whether or not the state of the communication line continues for more than the time (=tErrorRecovery+tDRP) (step S206).

If the state of the communication lines has not continued for more than the time (=tErrorRecovery+tDRP) (NO in step S206), the processor 112 repeats the process of step S204.

If the state of the communication line continues beyond the time (=tErrorRecovery+tDRP) (YES in step S206), the processor 112 changes the resistance value shown in the communication lines (the first communication line 21 and the second communication line 22) from Rp to Rd (step S208), and terminates the power supply operation to the DRP device.

d5: Benefits

The Type-C Standard allows transitions to ErrorRecovery at any time to reset connections between devices. According to the second embodiment, when the Power Bank 100 is in the UnatchWait_LB.SRC, even if an ErrorRecovery occurs, since it is not erroneously determined that the connection with the DRP device is physically disconnected, it is possible to avoid a situation in which the roles of power supplying and receiving are unintentionally reversed.

Forms, processes, and the like other than those described above are the same as those in the first Embodiment described above, and therefore, detailed description thereof will not be repeated here.

Third Embodiment

The first and second Embodiments described above describe the power supplying and receiving operation in a Power Bank 100 employing a single port corresponding to both power supplying and receiving. The third Embodiment will give a description of a power supplying and receiving operation suitable for a configuration in which a plurality of ports corresponding to both power supplying and power receiving are adopted, or a configuration in which a port for power receiving are additionally adopted.

Except for the configuration and treatment described below, the configuration and processing of the third Embodiment are the same as those of the first or the second Embodiment described above, and therefore detailed description thereof will not be repeated.

e1: State Transition

Figure 15:
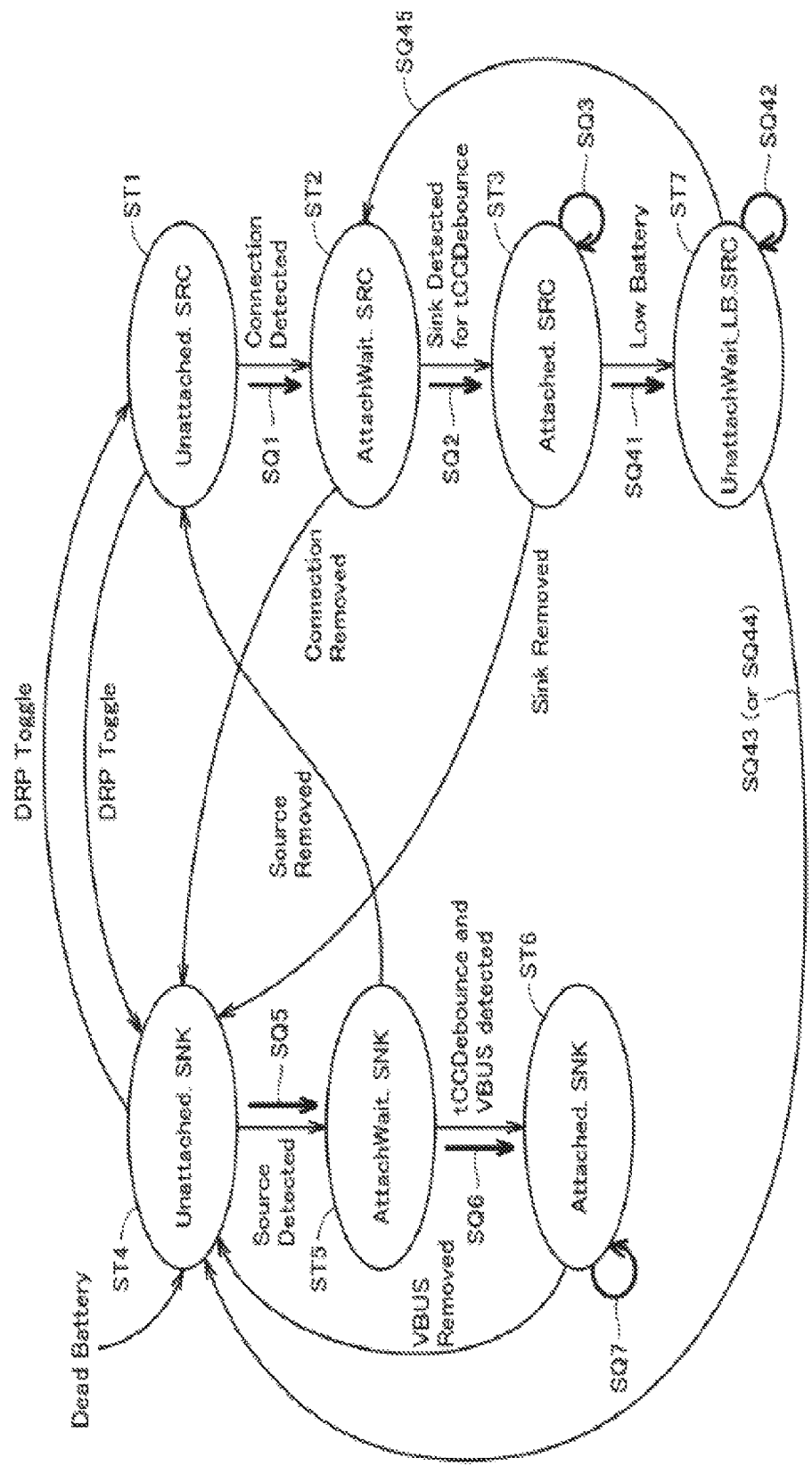
FIG. 15 is a diagram showing main part of state transitions of the Power Bank according to the third embodiment.

First, the state transition of the Power Bank 100 according to the third embodiment will be described. FIG. 15 is a diagram showing a main part of state transitions of the Power Bank 100 according to the third embodiment. The state transition shown in FIG. 15 differs from the state transition of the Power Bank 100 according to the first embodiment shown in FIG. 6 in that a transition from UnatchWait_LB.SRC (ST7) to AttachWait.SRC (ST2) is added. In FIG. 15, the substantially same states as the states shown in FIG. 6 are denoted by the same reference numerals. The description of the states described with reference to FIG. 6 will not be repeated.

When a plurality of ports corresponding to both power supply and power reception are adopted, or a configuration in which a port for power reception is additionally adopted, the battery can be charged through another port in a state of being connected to the DRP device. Therefore, when the Low Battery is resolved by the power received through the other port after the Power Bank 100 is turned Low Battery and the port transitions to UnatachWait_LB.SRC (ST7), the port transitions to AttachWait.SRC (ST2) (sequence SQ45). The process of detecting whether or not the connection with the DRP device is physically disconnected is terminated by the transition to the AttachWait.SRC (ST2).

By providing transitions from UnattachWait_LB.SRC (ST7) to AttachWait.SRC (ST2), the Power Bank 100 can directly power DRP devices using the power received via other ports.

As described above, in the third embodiment, as the transition condition from UnatachWait_LB.SRC (ST7), the condition that the battery is recovered from the Low Battery due to the charge is adopted (hereinafter, also referred to as the "third transition condition"). That is, the processor 112 corresponding to the state manager resumes power supply to the connection destination in accordance with the sequence as an SRC (rsupplying side) when the battery 106 is charged and the power supply to the connection destination is restored to a condition in which the power supply to the connection destination is possible.

As described above, in the third embodiment, by adopting the third transition condition suitable for the Power Bank 100 having a plurality of ports, a more appropriate power supplying and receiving operation is realized.

e2: Device Configuration

Figure 16:
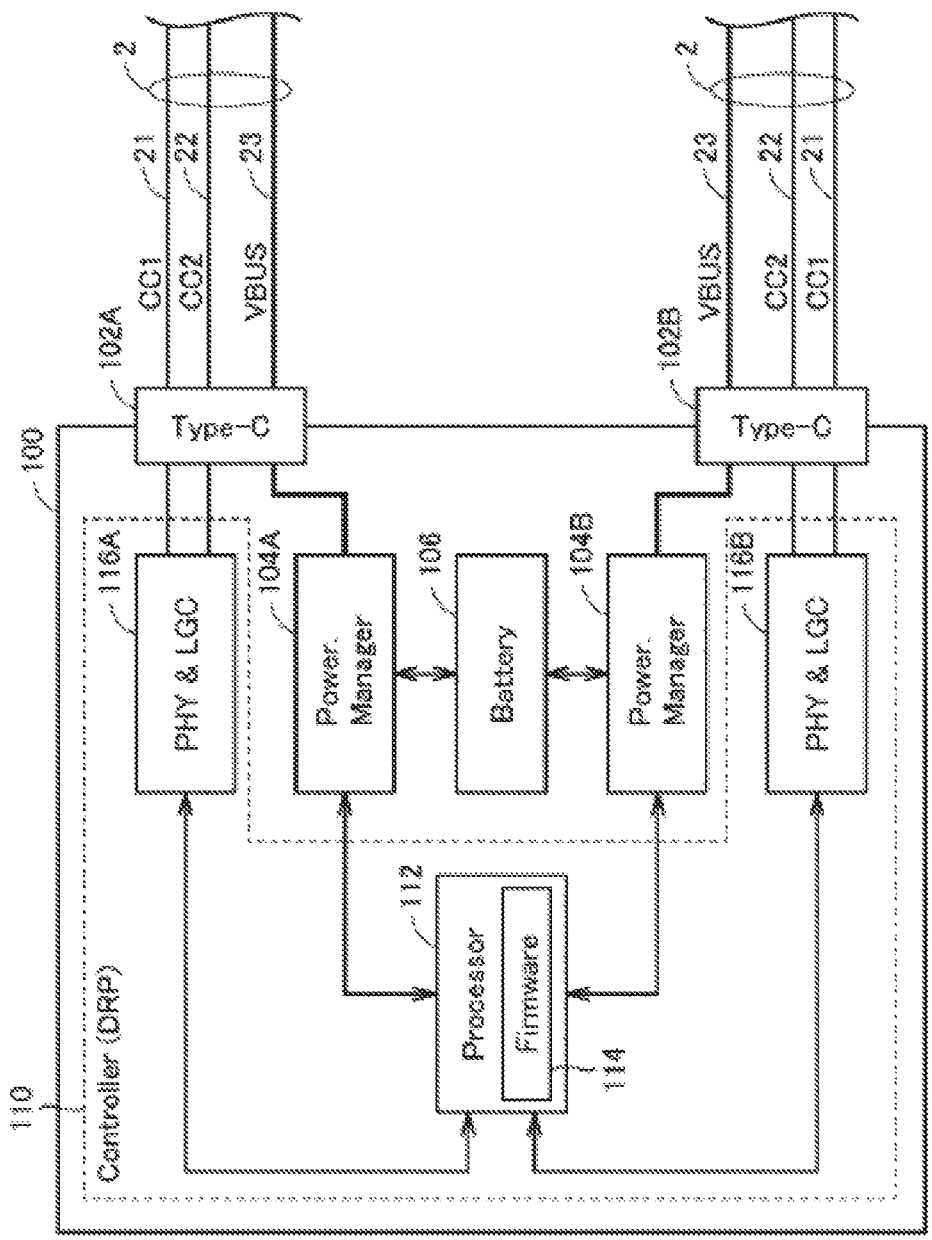
FIG. 16 is a schematic view illustrating an exemplary device configuration of a Power Bank according to the third exemplary embodiment.
Figure 17:
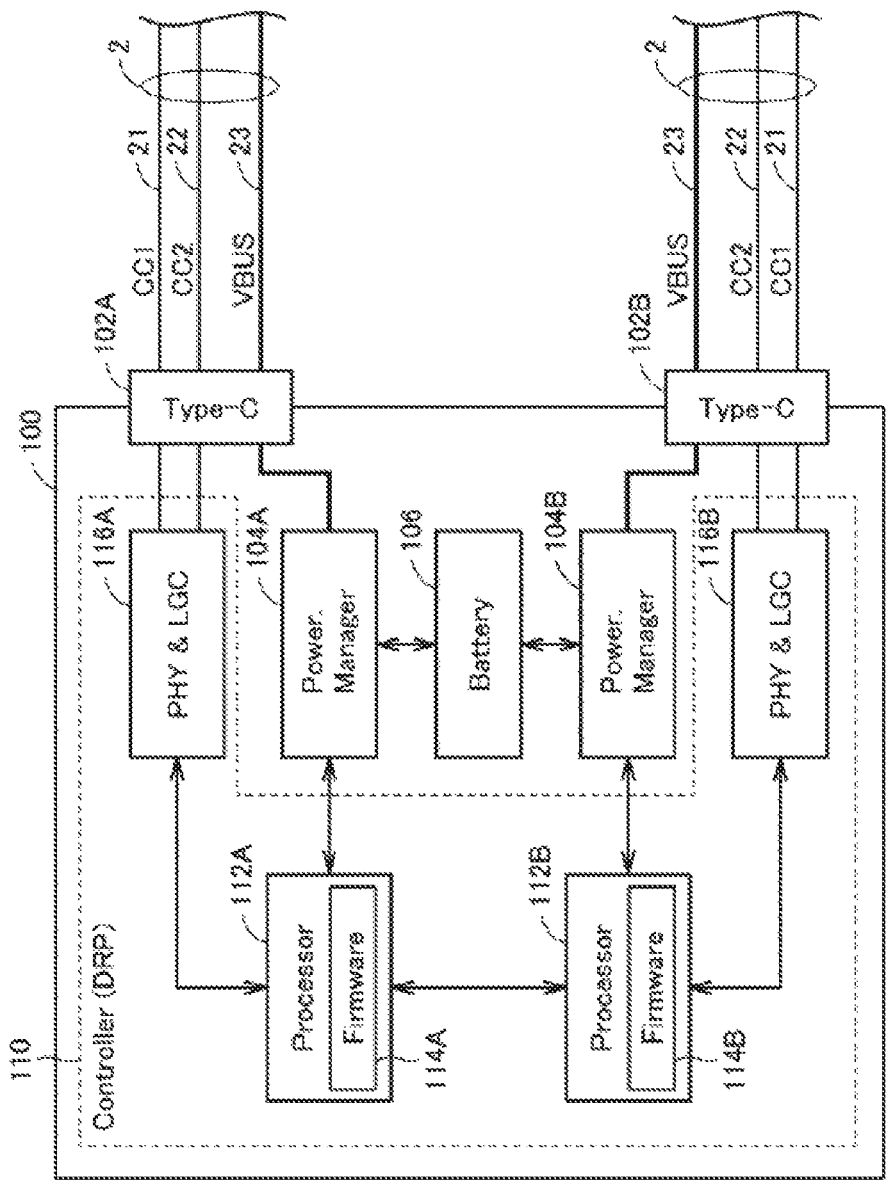
FIG. 17 is a schematic view illustrating an exemplary device configuration of a Power Bank according to the third exemplary embodiment.

Next, an example of a Power Bank 100 device configuration according to the third embodiment will be described. FIGS. 16 and 17 are schematic diagrams showing examples of the device configuration of the Power Bank 100 according to the third embodiment. FIGS. 16 and 17 show a device configuration having a plurality of ports of a USB Type-C interface. In the device form shown in FIGS. 16 and 17, the same members as those of the apparatus configuration shown in FIG. 4 are denoted by the same reference numerals.

Referring to FIG. 16, according to the third embodiment, the Power Bank 100 includes, as main components, connectors 102A and 102E, power supply managers (Power Managers) 104A and 104B, a battery 106, and a controller (Controller) 110.

Connectors 102A and 102B include ports of a USB Type-C interface.

The power managers 104A and 104B correspond to charge/discharge control circuits for controlling charge/discharge of the battery 106 in accordance with instructions from the controller 110.

The controller 110 includes processor 112, a signal transmission module (PHY & LGC) 116A connected to the connector 102A, a signal transmission module (PHY & LGC) 116B connected to the connector 102B, and a processor 112. The processor 112 is connected to the signal transmission modules 116A, 116B and the power managers 104A, 104B.

The processor 112 corresponds to a state manager that executes sequences according to the USB Type-C standard. The processor 112 executes the firmware 114, which is an example of a control program, to control a sequence executed via each of the connectors 102A and 102B.

Referring to FIG. 17, another Power Bank 100 according to the third embodiment includes connectors 102A and 102B, power supply managers (Power Managers) 104A and 104B, a battery 106, and a controller (Controller) 110 as main components.

The controller 110 includes processors 112A and 112B, a signal transmission module (PHY & LGC) 116A connected to the connector 102A, a signal transmission module (PHY & LGC) 116B connected to the connector 102B, and a processor 112. Signal transmission modules 116A and 116B are provided for each port.

The processor 112A is connected to the signal transmission module 116A and the power manager 104A. The processor 112B is also connected to the signal transmission module 116B and the power manager 104B. Further, the processor 112A and the processor 112B are connected to each other.

The processor 112A executes the firmware 114A, which is an example of a control program, to control a sequence executed via the connector 102A. The processor 112B controls the sequence executed via the connector 102B by executing the firmware 114B, which is an example of the control program.

Since the rest of the configuration of the Power Bank 100 shown in FIGS. 16 and 17 is the same as the corresponding configuration of the Power Bank 100 shown in FIG. 4, detailed descriptions thereof will not be repeated.

e3: Processing Sequence

Next, an example of a processing sequence of the power supplying and receiving treatment executed between the Power Bank 100 and the PC 200, which is an example of the DRP device, according to the third embodiment will be described.

Figure 18:
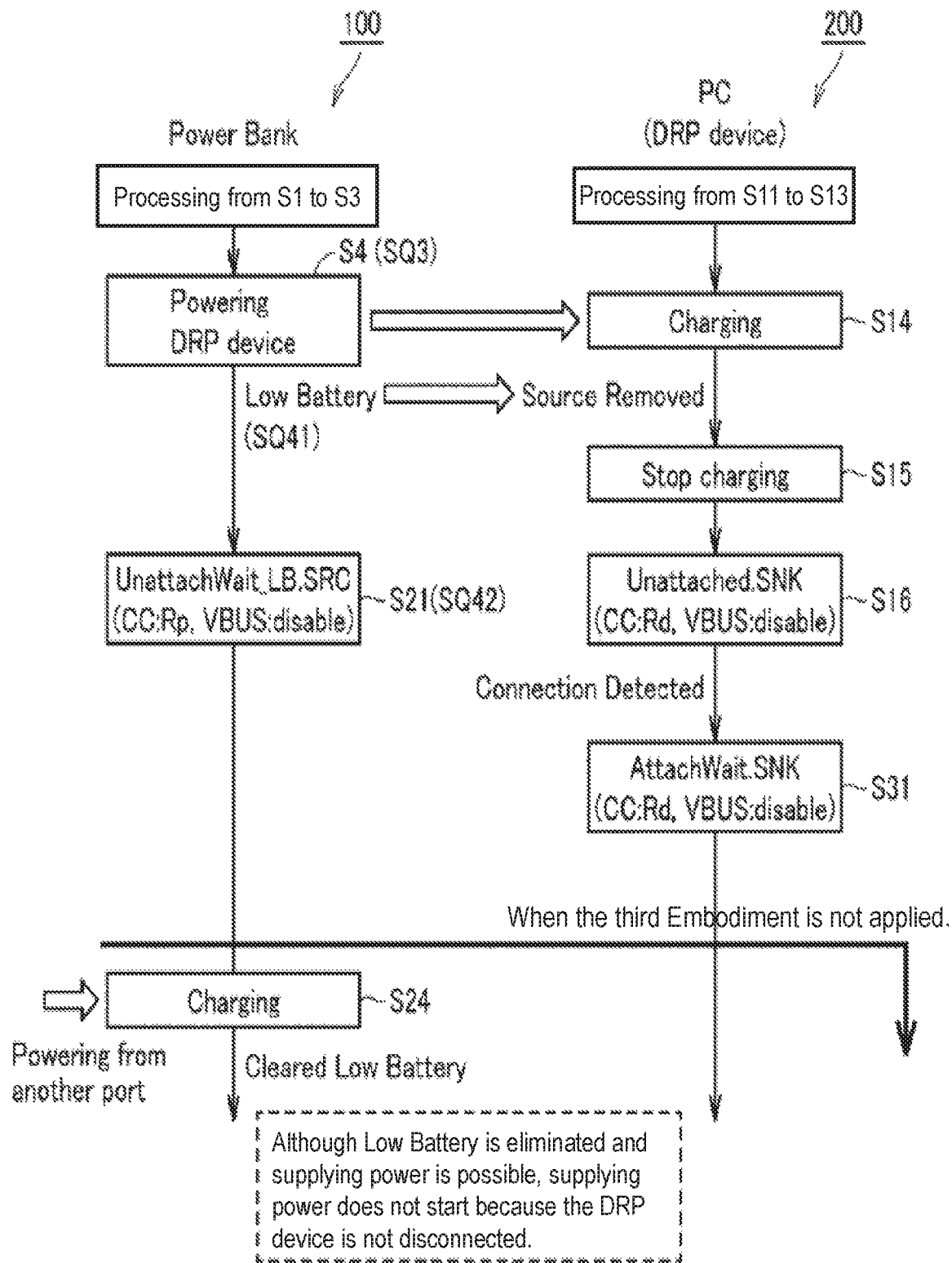
FIG. 18 is a sequence chart illustrating a processing sequence pertaining to a power supplying and receiving operation executed between a Power Bank that does not adopt a transition condition according to the third embodiment and a PC.

FIG. 18 is a sequence chart showing a process sequence relating to a power supplying and receiving operation executed between a Power Bank 100 and a PC 200 which do not adopt a transition condition according to the third embodiment. In the sequence chart shown in FIG. 18, the substantially same processing as any of the sequence charts described above is denoted by the same reference numerals. The description of the treatment described above will not be repeated.

Referring to FIG. 18, the Power Bank 100 transitions from Unattached.SRC to Attach.SRC via AttachWait.SRC (steps S1, S2, S3), and starts supplying power to the PC 200 (step S4).

On the other hand, the PC 200 transitions from Unattached.SNK to Attach.SNK via AttachWait.SNK (steps S11, S12, S13), and starts receiving power from the Power Bank 100 (step S14).

Thereafter, when the discharging voltage of the battery 106 in Power Bank 100 drops to a predetermined value, the Power Bank 100 turns Low Battery, and the discharging voltage transitions from Attach.SRC UnatachWait_LB.SRC (step S21). In this condition, the power from the Power Bank 100 to the PC 200 is stopped. However, the Power Bank 100 maintains the state of the SRC.

On the other hand, the PC 200 stops receiving electric power by stopping supplying electric power from the Power Bank 100 (step S15). Then the PC 200 transitions from Attached.SNK to UnatachWait.SNK (step S16). Further, by detecting the presence of the connected Power Bank 100, the PC 200 determines that the condition of "Connection Detected" is satisfied, and transitions from Unattached.SNK to AttachWait.SNK (step S31).

In this situation, it is assumed that the Power Bank 100 receives power via a port other than the port connected to the PC 200. That is, the Power Bank 100 starts receiving electric power from the external power supply (step S24). For example, the Power Bank 100 may be powered by an external power supply, such as the power supply adapter 300. It is assumed that the battery 106 is charged by supplying power through the other ports, and the Low Battery is eliminated.

In this manner, even if the Low Battery of the Power Bank 100 is solved and the DRP device can be supplied with power, it is not detected that the connection with the DRP device is disconnected, so that the connection is maintained at UnatchWait_LB.SRC and the power supply cannot be started.

As described above, when the first transition condition according to the first embodiment or the second transition condition according to the second embodiment is adopted instead of the third transition condition according to the third embodiment, when the Power Bank 100 is in the UnattachWait_LB.SRC, the state transition does not occur and remains in the UnattachWait_LB.SRC even if the Low Battery is resolved by the power supply through the other ports. As a result, since the VBUS is not turned enable, the power to the DRP device is not resumed.

That is, the DRP device cannot be recharged unless the connections between the Power Bank 100 and the DRP device are physically disconnected.

In the third embodiment, when the Power Bank 100 is in the UnattachWait_LB.SRC as described above, the fact that the battery 106 is charged by supplying power through another port and the Low Battery is eliminated is adopted as the transition condition from the UnattachWait_LB.SRC (ST7). By adopting such a third transition condition, even if the connection between the Power Bank 100 and the DRP device is not physically disconnected, the power supply to the DRP device can be resumed in accordance with the state of the power supply from the external power supply or the charge state of the battery 106.

Figure 19:
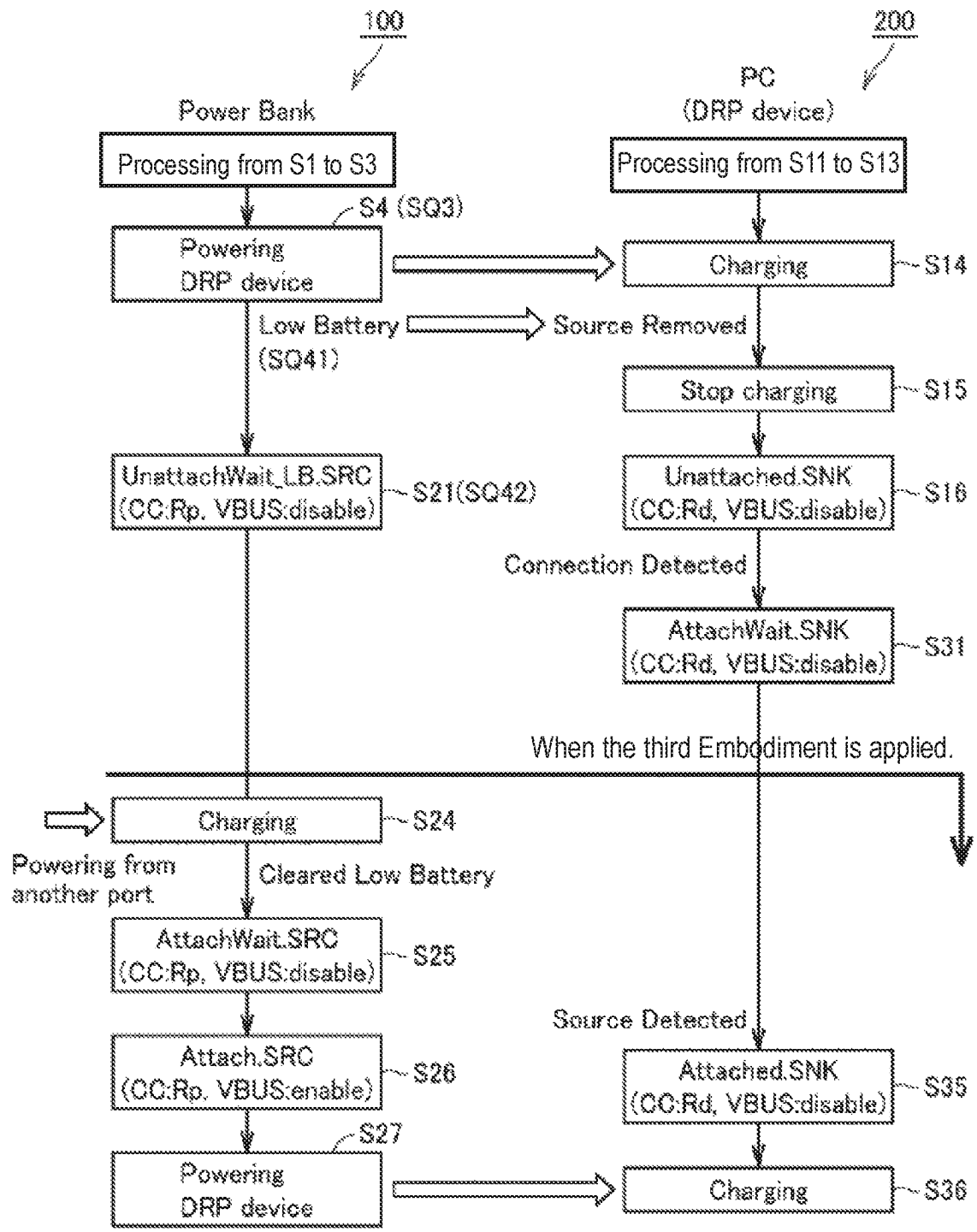
FIG. 19 is a sequence chart illustrating a processing sequence pertaining to a power supplying and receiving operation executed between a Power Bank according to the third embodiment and a PC.

FIG. 19 is a sequence chart showing a process sequence relating to the power supplying and receiving operation executed between the Power Bank 100 and the PC 200 according to the third embodiment. In the sequence chart shown in FIG. 19, the substantially same processing as any of the sequence charts described above is denoted by the same reference numerals. The description of the treatment described above will not be repeated.

Referring to FIG. 19, the Power Bank 100 transitions from Unattached.SRC to Attach.SRC via AttachWait.SRC (steps S1, S2, S3), and starts supplying power to the PC 200 (S4).

On the other hand, the PC 200 transitions from Unattached.SNK to Attach.SNK via AttachWait.SNK (steps S11, S12, 13), and starts receiving power from the Power Bank 100 (step S14).

In this manner, the controller 110 of the Power Bank 100 connects the pull-up resistors 1165 and 1167 (first resistors; resistance values Rp) indicating the SRCs (power supply sides) to the communication lines, and supplies the electric power stored in the battery 106 to the connection destination.

Thereafter, when the discharging voltage of the battery 106 in the Power Bank 100 drops to a predetermined value, the Power Bank 100 turns Low Battery, and the discharging voltage transitions from Attach.SRC to UnatachWait_LB.SRC (step S21). In this condition, the power from the Power Bank 100 to the PC 200 is stopped. However, the Power Bank 100 maintains the state of the SRC.

On the other hand, the PC 200 stops receiving electric power by stopping supplying electric power from the Power Bank 100 (step S15). Then the PC 200 transitions from Attached.SNK to UnattachWait.SNK (step S16).

In this manner, the controller 110 of the Power Bank 100 connects the pull-up resistors 1165 and 1167 (first resistors; resistance values Rp) indicating the SRCs (power supply sides) to the communication lines, and supplies the electric power stored in the battery 106 to the connection destination.

Further, by detecting the presence of the connected Power Bank 100, the PC 200 determines that the condition of "Connection Detected" is satisfied, and transitions from Unattached.SNK to AttachWait.SNK (step S31).

In this situation, it is assumed that the Power Bank 100 receives power via a port other than the port connected to the PC 200. That is, the Power Bank 100 starts receiving electric power from the external power supply (step S24). For example, the Power Bank 100 may be powered by an external power supply, such as the power supply adapter 300. It is assumed that the battery 106 is charged by supplying power through the other ports, and the Low Battery is eliminated.

When the Low Battery is resolved, the Power Bank 100 determines that the transition condition from UnattachWait_LB.SRC is satisfied, and transitions from UnattachWait_LB.SRC to UnattachWait.SRC (step S25). In other words, the Power Bank 100 waits for the connection of the device to be SNK. At this time, the Power Bank 100 determines that the condition of "Sink Detected" is satisfied by detecting that the connected PC 200 is waiting for a reply from the SRC, and transitions from AttachWait.SRC to Attached.SRC (step S26). In Attached.SRC, the Power Bank 100 starts supplying the specified voltages to the power lines.

On the other hand, the PC 200 determines that the condition of "Source Detected" is satisfied by detecting that the connected Power Bank 100 is waiting for a reply from SNK, and transitions from AttachWait.SNK to Attached.SNK (step S35).

When the Power Bank 100 becomes Attached.SRC and the PC 200 becomes AttachWait.SNK, the Power Bank 100 starts supplying power to the PC 200 (step S27), and the PC 200 starts receiving power from the Power Bank 100 (step S26).

As described above, if the Power Bank 100 is UnattachWait_LB.SRC, receiving power via another port can transition from UnattachWait_LB.SRC to AttachWait.SRC when the Low Battery is resolved. Transitions to AttachWait.SRC will rediscover DRP devices and turn enable the VBUS. As a result, the DRP device transitions from AttachWait.SNK to Attached.SNK and the DRP device is recharged from Power Bank 100.

Thus, when the Power. Bank 100 becomes rechargeable without physically disconnecting the Power Bank 100 from the DRP device, power is resumed from the Power Bank 100 to the DRP device.

e4: Operation Example

Next, according to the third embodiment, an example of a supplying and receiving power operation performed between a Power Bank 100 and a PC 200, which is an example of a DRP device, will be described.

Figure 20A:
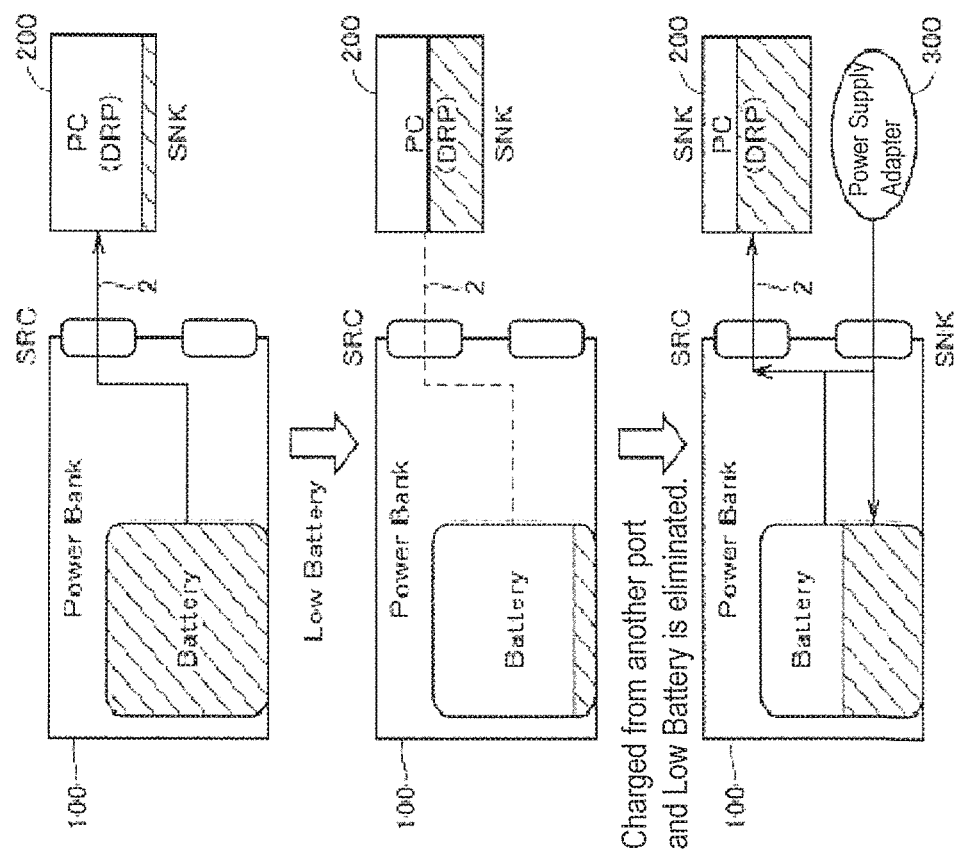
FIG. 20A and FIG. 20B are schematic diagrams showing an example of an operation of a power supplying and receiving operation performed between a Power Bank and a PC in accordance with the third embodiment.
Figure 20B:
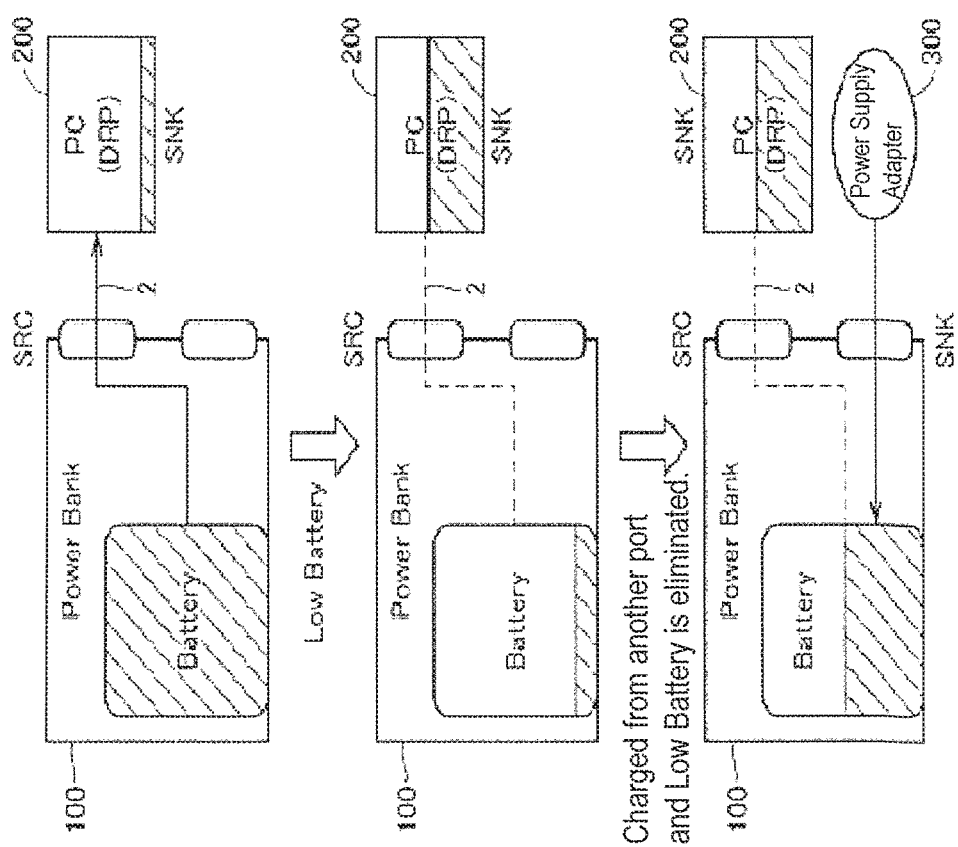

FIG. 20 is a schematic diagram showing an exemplary operation of the power supplying and receiving operation executed between the Power Bank 100 and the PC 200 according to the third embodiment. FIG. 20A shows an operation example when charging by an external power supply is performed in the power supplying and receiving operation in the Power Bank 100 where the transition condition according to the third embodiment is not adopted as a comparative example, and FIG. 20B shows an operation example when charging by an external power supply is performed in the power supplying and receiving operation in the Power Bank 100 where the transition condition according to the third embodiment is adopted.

In the USB Type-C standard, since the state machine is controlled for each port, devices having a plurality of ports can be individually operated as SRCs or SNKs for each port.

Referring to FIG. 20A, when the Power Bank 100 is turned Low Battery during the power supply from the Power Bank 100 to the PC 200 which does not adopt the transition condition according to the third embodiment, the power supply from the Power Bank 100 to the PC 200 is stopped. Here, even if power is received via another port and the Low Battery is removed, the Power Bank 100 remains at UnattachWait_LB.SRC, so the PC 200 cannot be recharged.

On the other hand, referring to FIG. 20B, when the Power Bank 100 is turned Low Battery during the power supply from the Power Bank 100 to the PC 200 according to the third embodiment, the power supply from the Power Bank 100 to the PC 200 is stopped. Here, when power is received via another port and the Low Battery is removed, the Power Bank 100 transitions to Unattached.SNK (ST4). Then, by executing predetermined sequences, the Power Bank 100 can recharge the PC 200 without disconnecting the physical connections with the PC 200.

When the Power Bank 100 has a plurality of ports and power is simultaneously supplied and received, if the received power is larger than the supplied power, the power used for power supply is supplied from the received power, and the remainder is stored in the battery 106. On the other hand, when the power being received is smaller than the power being supplied, the power used for the power supply is covered by the power being received and the power discharged from the battery 106.

As described above, when the Power Bank 100 has a port capable of receiving power from an external power supply in addition to the port used for supplying power to the DRP device, the DRP device can be easily recharged by adopting the transitional condition according to the third embodiment. That is, if the Low Battery is resolved by the power received through another port after the Power Bank 100 is turned Low Battery by supplying power to the DRP device, the power supply from the Power Bank 100 to the DRP device can be resumed without physically disconnecting the Power Bank 100 from the DRP device.

e5: Processing Procedure

Next, according to the third embodiment, a process sequence of the power supplying and receiving operation performed between the Power Bank 100 and the PC 200, which is an example of a DRP device, will be described.

Figure 21:
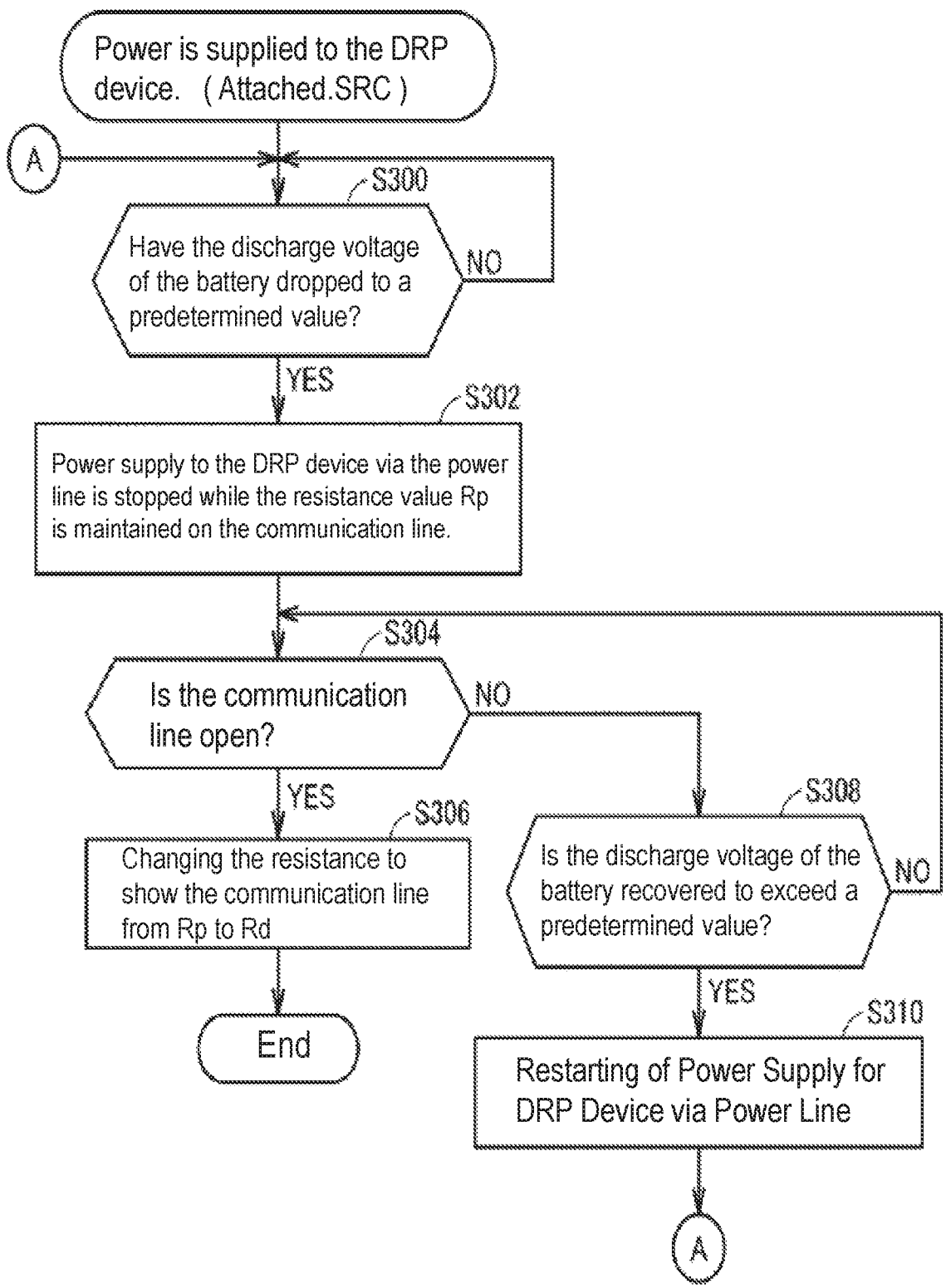
FIG. 21 is a flowchart illustrating a processing procedure pertaining to a power supplying and receiving operation of a Power Bank according to the third embodiment.

FIG. 21 is a flow chart showing the process procedures relating to the power supply operation of the Power Bank 100 according to the third embodiment. The steps of the Power Bank 100 shown in FIG. 21 are typically realized by the processor 112 of the controller 110 executing the firmware 114, which is a control program. Therefore, the execution subject of each step shown in FIG. 21 is typically the processor 112.

Referring to FIG. 21, the processor 112 determines whether the discharging voltage of the battery 106 drops to a predetermined voltage while the DRP device is powered by the DRP device in the Attached.SRC (step S300). If the discharging voltage of the battery 106 has not decreased to the predetermined value (NO in step S300), the processor 112 repeats the process of step S300.

If the discharging voltage of the battery 106 has dropped to a predetermined value (YES in step S300), the processor 112 stops the power supply to the DRP device via the power supply line (step S302) while maintaining the resistance value Rp on the communication lines (the first communication line 21 and the second communication line 22).

Then, the processor 112 determines whether or not the communication lines (the first communication line 21 and the second communication line 22) are open (step S304).

If the communication line is open (YES in step S304), the processor 112 changes the resistance value shown in the communication lines (the first communication line 21 and the second communication line 22) from Rp to Rd (step S306), and terminates the power supply operation to the DRP devices.

If the communication lines are not open (NO in step S304), the processor 112 determines whether or not the discharging voltage of the battery 106 has recovered until the discharging voltage exceeds a predetermined value (step S308). If the discharging voltage of the battery 106 has not recovered to a value exceeding the predetermined value (NO in step S308), the processor 112 repeats the process of step S304 and subsequent steps.

If the discharging voltage of the battery 106 has recovered to a value exceeding a predetermined value (YES in step S308), the processor 112 restarts the power supply to the DRP device via the power line (step S310). Then, the processor 112 repeats the treatments of step S300 and after.

Note that a value different from the threshold value used for comparing the discharge voltage of the battery 106 (determination of Low Battery) in step S300 and the threshold value used for comparing the discharge voltage of the battery 106 (determination of restoration from Low Battery) in step S308 may be used. Normally, the threshold value used in step S308 is set to a value higher than the threshold value used in step S300 so that hunting does not occur.

e6: Advantages

In a Power Bank 100 where multiple ports corresponding to both power supplying and power receive are employed, or in a Power Bank 100 where additional ports are used for power receiving, the battery of the Power Bank 100 can be charged from another port while the connection destination DRP device is connected. In such a configuration, after the Power Bank 100 is turned Low Battery and transitions to UnattachWait_LB.SRC, if the Low Battery is resolved by the power received through the other port, transitions to AttachWait.SRC.

Transitioning to AttachWait.SRC allows the Power Bank 100 to re-power the DRP device using power received via the other port and/or power stored in the battery 106 without disconnecting the physical connections with the DRP device.

Fourth Embodiment

The first to the third Embodiments described above may be suitably combined with each other or any modifications may be made.

For example, a configuration may be adopted in which the first transition condition adopted in the first Embodiment or the second transition condition adopted in the second Embodiment and the third transition condition adopted in the third Embodiment are combined.

Logic that can be realized for both of the first transition condition employed in the first embodiment and the second transition condition employed in the second embodiment may be implemented, and any one of the transition conditions may be validated depending on the situation. More specifically, it is possible to select which of the transitional conditions should be validated in accordance with the type or serial number of the external devices connected to the Power Bank 100. In this case, the third transition conditions employed in the third Embodiment may be further combined.

Further, as the second transition condition, the state in which the state (the voltage appearing in the CC1 is not vRd and the voltage appearing in the CC2 is not vRd) is continued for more than the time (=tErrorRecovery+tDRP) is exemplified, but the time used for the continuation determination may be made longer to prevent erroneous determination.

Further, in the USB Type-C standard, USB Power Delivery, which is a power supply standard for realizing the exchange of electric power using USB cables, can be used. The configurations according to the first Embodiment to the third Embodiment are also applicable to cases where USB Power Delivery is used.

Fifth Embodiment

In the above-described the first to the fourth embodiments, the processor 112 executes the firmware 114 to execute the treatment and provide the functions related to the controller 110 as described above.

The firmware 114 executed by the processor 112 is a control program and can be installed or updated from the outside. Firmware 114 may, for example, be distributed as stored in a non-transient (non-transitory) recording medium and installed or updated (updated) to a storage area within controller 110. As the non-temporary recording medium, an optical recording medium such as an optical disk, a semiconductor recording medium such as a flash memory, a magnetic recording medium such as a hard disk or a storage tape, or a magneto-optical recording medium such as an MO (Magneto-Optical disk) may be used. That is, the present embodiment may also include a computer-readable control program for realizing the treatment and functions as described above, and a recording medium storing the control program.

Alternatively, the firmware 114 may be downloaded from a server device via the Internet or an intranet.

Those skilled in the art will design a controller and a device including the controller according to the present embodiment by appropriately using a technique according to an age in which the present embodiment is implemented.

Sixth Embodiment

In the above-described first to fifth embodiments, the processor 112 executes the firmware 114 to realize the execution of the processing and the provision of the functions related to the controller 110 as described above. However, some or all of the software may be implemented in hardware instead of such software implementation. For hardware-mounting, hard-wired devices such as ASIC (Application Specific Integrated Circuit) and FPGA (Field-Programmable Gate Array) may be employed.

Those skilled in the art will design a controller and a device including the controller according to the present embodiment by appropriately using a technique according to an age in which the present embodiment is implemented.

According to the present embodiment, once the power supply from the power supply side to the external devices is started, the power stored in the battery on power supply side subsequently drops and becomes Low Battery, and even if the USB cable is kept connected as it is, the roles of the power supplying and receiving do not change. Therefore, there is no event that electric power returns from the battery of the external device, which was originally on the power reception side, to the battery, which was originally on the power supply side.

Although the invention made by the present inventor has been specifically described based on the embodiment, the present invention is not limited to the above embodiment, and it is needless to say that various modifications can be made without departing from the gist thereof.

What is claimed is:

1. A controller for providing a port compatible with DRP (Dual Role Power), which can be either a power supply side or a power reception side according to a USB (Universal Serial Bus) Type-C standard, the controller comprising:
a state manager coupled to a power manager for controlling charging and discharging of a battery; and
a signal transmission module for exchanging a signal with a connection destination via a communication line in a USB cable according to an instruction from the state manager,
wherein the signal transmission module is configured to indicate whether the port is functioned as the power supply side or the power reception side, and
wherein the state manager is configured to:
when the port is functioned as the power supply side, supply an electric power stored in the battery to the connection destination;
when a condition of the battery indicates a Low Battery condition, stop supplying the electric power to the connection destination while maintaining a state that the port is functioned as the power supply side; and
resume supplying the electric power to the connection destination according to a sequence as the power reception side when the battery is charged and restored to a condition of supplying the electric power to the connection destination.

2. The controller of claim 1,
wherein the signal transmission module is configured to selectively connect a first resistor or a second resistor to the communication line, the first resistor indicating the power supply side, the second resistor indicating the power reception side, and
wherein (1) when the first resistor is connected to the communication line and the electric power from the battery is supplied to the connection destination, and (2) when the electric power is unable to be supplied to the connection destination, the state manager is configured to stop supplying the electric power to the connection destination while maintaining a state in which the first resistor is connected to the communication line.

3. The controller of claim 2, wherein when a connection with the connection destination is disconnected, the state manager connects the second resistor indicating the power reception side to the communication line instead of the first resistor indicating the power supply side.

4. The controller of claim 3, wherein the state manager decides that the connection with the connection destination is disconnected when the communication line is opened.

5. The controller of claim 3,
wherein a first voltage appears on the communication line when the controller is on the power supply side and the connection destination is on the power reception side, and
wherein when a second voltage different from the first voltage appears on the communication line for a period of time exceeding a predetermined time, the state manager determines that the connection with the connection destination is disconnected.

6. The controller of claim 5, wherein the predetermined time is set to be more than or equal to a sum of a time required to keep the communication line opened in an Error Recovery state and the time required for a DRP (Dual Role Power) Toggle operation.

7. The controller of claim 1, wherein the signal transmission module is provided for the port.

8. The controller of claim 1, wherein the state manager is implemented by a processor executing a control program.

9. A control method for a controller providing a port compatible with DRP (Dual Role Power), which can be either a power supply side or a power reception side according to a USB (Universal Serial Bus) Type-C standard,
wherein the controller has a signal transmission module for exchanging a signal with a connection destination via a communication line in a USB cable,
wherein the signal transmission module is configured to indicate whether the port is functioned as the power supply side or the power reception side, and
wherein the control method comprises:
when the port is functioned as the power supply side, supplying an electric power stored in a battery to the connection destination;
when a condition of the battery indicates a Low Battery condition, stopping supplying the electric power to the connection destination while maintaining a state that the port is functioned as the power supply side; and
resuming supplying the electric power to the connection destination according to a sequence as the power reception side when the battery is charged and restored to a condition of supplying the electric power to the connection destination.

10. The control method of claim 9,
wherein the signal transmission module is configured to selectively connect a first resistor or a second resistor to the communication line, the first resistor indicating the power supply side, the second resistor indicating the power reception side, and
wherein (1) when the first resistor is connected to the communication line and the electric power from the battery is supplied to the connection destination, and (2) when the electric power is unable to be supplied to the connection destination, the control method comprises stopping supplying the electric power to the connection destination while maintaining a state in which the first resistor is connected to the communication line.

11. A control program, stored on a non-transitory recording medium, executed by a processor of a controller for providing a port compatible with DRP (Dual Role Power), which can be either a power supply side or a power reception side according to a USB (Universal Serial Bus) Type-C standard, wherein the controller has a signal transmission module for exchanging a signal with a connection destination via a communication line in a USB cable, wherein the signal transmission module is configured to indicate whether the port is functioned as the power supply side or the power reception side, and wherein the control program executed by the processor comprises:

when the port is functioned as the power supply side, supplying an electric power stored in a battery to the connection destination;

when a condition of the battery indicates a Low Battery condition, stopping supplying the electric power to the connection destination while maintaining a state that the port is functioned as the power supply side; and resuming supplying the electric power to the connection destination according to a sequence as the power reception side when the battery is charged and restored to a condition of supplying the electric power to the connection destination.

12. The control program of claim 11, wherein the signal transmission module is configured to selectively connect a first resistor or a second resistor to the communication line, the first resistor indicating the power supply side, the second resistor indicating the power reception side, and wherein (1) when the first resistor is connected to the communication line and the electric power from the battery is supplied to the connection destination, and (2) when the electric power is unable to be supplied to the connection destination, the control program executed by the processor comprises stopping supplying the electric power to the connection destination while maintaining a state in which the first resistor is connected to the communication line.

* * * * *